DIGITAL COMPUTING SYSTEM

Filed Nov. 1, 1955 8 Sheets-Sheet 1

INVENTORS.
Lowell S. Bensky &
David L. Nettleton
BY Morris Rabkin
ATTORNEY.

INVENTORS.
Lowell S. Bensky &
David L. Nettleton
BY Morris L. Rabkin
ATTORNEY.

INVENTORS.
Lowell S. Bensky &
David L. Nettleton
BY Morris Rabkin
ATTORNEY.

INVENTORS
Lowell S. Bensky &
David L. Nettleton
BY Morris A. Rabkin
ATTORNEY.

INVENTORS.
Lowell S. Bensky &
David L. Nettleton
BY Morris Rabkin
ATTORNEY.

INVENTORS.
Lowell S. Bensky &
David L. Nettleton
BY
Morris [signature]
ATTORNEY.

INVENTORS.
Lowell S. Bensky &
David L. Nettleton
BY Morris [signature]
ATTORNEY.

INVENTORS.
Lowell S. Bensky &
David L. Nettleton
BY Morris Rabkin
ATTORNEY.

United States Patent Office 3,016,194

Patented Jan. 9, 1962

3,016,194

DIGITAL COMPUTING SYSTEM

Lowell S. Bensky, Levittown, Pa., and David L. Nettleton, Haddonfield, N.J., assignors to Radio Corporation of America, a corporation of Delaware Filed Nov. 1, 1955, Ser. No. 544,275
20 Claims. (Cl. 235—157)

DIGITAL COMPUTING SYSTEM

*Table of contents*

| | Column |
|---|---|
| 1.0 Introduction | |
| 2.0 Detailed description | |
| 2.1 Description of circuits—Preliminary | 3 |
| 2.2 Description of circuits of Figure 1 | 3 |
| 2.3 Description of circuits of Figure 2 | 6 |
| 2.4 Description of circuits of Figure 3 | 9 |
| 2.5 Description of circuits of Figure 4 | 11 |
| 2.6 Description of circuits of Figure 5 | 14 |
| 2.7 Description of circuits of Figure 6 | 17 |
| 3.0 Operation | |
| 3.1 Staticizing instruction | 19 |
| 3.1.1 Status level R001 high | 19 |
| 3.1.2 Status level R002 high | 20 |
| 3.1.3 Status level R003 high | 21 |
| 3.1.4 Summary of status levels | 22 |
| 3.2 Performing operation M (Multiplication) | 22 |
| 3.2.1 Status level RS high | 23 |
| 3.2.2 Three possible conditions under RS high | 25 |
| 3.2.2.1 One or both characters space | 25 |
| 3.2.2.2 ISS before other characters | 26 |
| 3.2.2.3 Non-space characters | 27 |
| 3.2.3 Status level RI high | 27 |
| 3.2.3.1 First multiplier digit zero—RI-ROM sequence | 27 |
| 3.2.3.2 First multiplier digit—not-zero—RI-RO sequence | 28 |
| 3.2.3.3 Conclusion of RI status level | 30 |
| 3.2.4 Status level RO high | 31 |
| 3.2.5 RI-RO-RI sequence | 32 |
| 3.2.6 Status level RN high (renew multiplicand and partial product address) | 32 |
| 3.2.7 Status level ROM high | 33 |
| 3.2.8 Status level RD high | 36 |
| 3.2.9 Status level ROM high again | 36 |
| 3.2.10 Status level RI high with a zero multiplier digit after a non-zero multiplier digit | 37 |
| 3.2.11 Completion | 38 |
| 3.3 Flow of status levels and summary of operation | 38 |
| 3.4 Zeros in the multiplier | 41 |
| 4.0 Conclusion | 42 |

1 *Introduction*

The present invention relates to digital computing systems, and particularly to a system for multiplying coded numbers.

Presently, digital computing techniques and systems are becoming widely used in many applications, such as in work of essentially commercial nature. Commercial installations require the storage of and manipulation of great masses of information. Ready access to economical storage of such information is largely dependent upon the compactness of which such information can be stored.

Previously, each basic grouping of information such as a word (also called an item) was allotted a predetermined number of character positions, each unused position being filled with a space symbol. The use of such standard word lengths, however, usually meant that the standard length adopted had to be the length of the maximum anticipated item of information. The use of standard word lengths thus resulted in a great deal of waste storage space. Therefore, computing systems and coding techniques have had to be devised which allow the use of variable non-standard maximum length items. The items are called non-standard because item lengths may be different for the different items. The items are termed variable because each item may assume any number of places, not exceeding the maximum allotted to it.

A multiplication system operating on such items of variable non-standard maximum length creates additional problems. In order that operations may be performed thereon in an efficient way, once the effective beginning of each item of information is detected, knowledge relative to this beginning point which may be changed during the operation should be retained while the operation with these items is being performed. Further it is desirable to reduce manipulation of the partial products obtained. One such manipulation which it is particularly desirable to reduce is that of shifting the partial product.

It is, therefore, an object of this invention to provide an improved multiplication system for quantities represented by electrical signals in a binary type code.

Another object of this invention is to provide an improved multiplication system, which system operates automatically without special programming.

Still another object of this invention is to automatically multiply quantities coded as variable non-standard maximum length items.

An additional object is to provide an improved system for multiplying electrically represented quanties at a high rate of speed wherein the storage locations of the least significant characters of each of the quantities need be ascertained only once.

Yet another object to this invention is to automatically multiply quantities simply and efficiently at a high rate of speed by the use of an improved process, which provides, in effect, a shift.

In accordance with the invention, an arrangement is provided which operates on electrical signals representing binary coded decimal information. The storage locations of the least significant digits of the mutiplier and the multiplicand are ascertained after search and entered in storage at the beginning of the multiplication operation. Multiplication is then performed by repeated additions and apparent shifts. The multiplicand is first added sequentially digit by digit to itself a number of times corresponding to the first decimal digit of the multiplier. At each addition, the successive decimal digits of the multiplicand are sequentially added to the corresponding decimal digits of the resultant partial product.

When the succession of serial additions for a particular multiplier digit is completed, the address, that is, the storage location, of the multiplier in the multiplier storage, is advanced by one. Also, the partial product address is advanced by one. The address of the least significant digit of the multiplicand is retained in storage without change. Thus, when each more significant multiplier digit is brought out, the multiplicand is added to successive more significant digits of the prior partial product. The effect is equivalent to shifting the partial product to the right. However, unnecessary manipulation of the digits of the partial product is avoided.

The novel features of this invention as well as the invention itself, both as to its organization and method of operation, will best be understood from the following description, when read in connection with the accompanying drawings, in which like reference numerals refer to like parts, in which:

FIGURES 1 to 6, inclusive, constitute a schematic diagram of the components in block form of so much of a computer embodying the invention as provides a clear understanding of the invention itself;

2.0 *Detailed description*

2.1 *Description of circuits—Preliminary*

Figure 1:
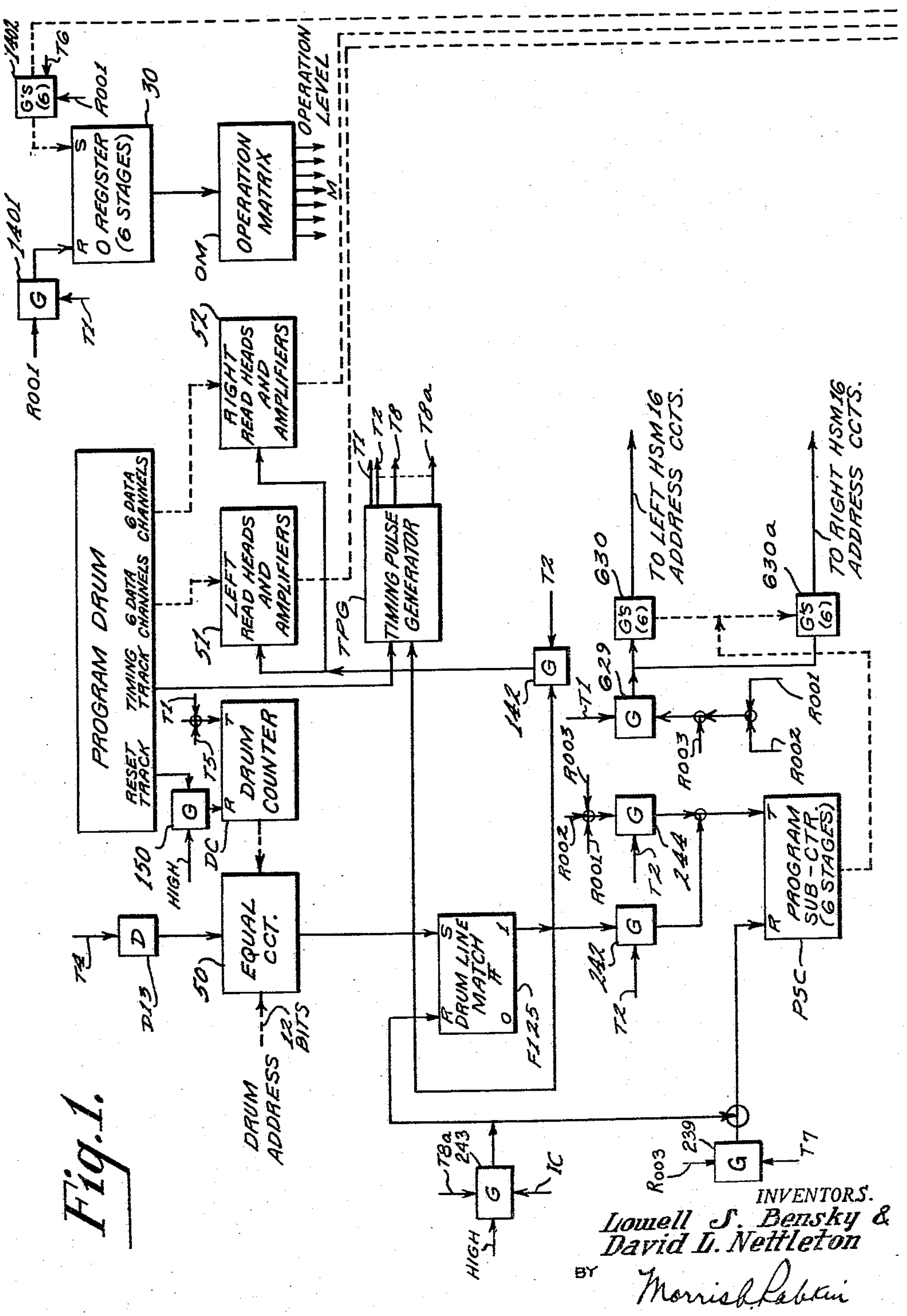
FIGURE 1 is at the top with FIGURE 2 immediately below, FIGURE 3 below FIGURE 2, FIGURE 4 below FIGURE 3.

The present invention is embodied in a computer which is more fully described in a copending application entitled "Information Handling System" by one of the present applicants, Lowell S. Bensky, Serial No. 478,021, filed December 28, 1954. It may be noted that the various components bear similar designations and the same reference numerals as the similar components in the drawings in the said Bensky application. The said Bensky application describes a computer in detail including various operations among which is an operation for multiplying numbers stored in the memory of the computer. This multiplication operation is the one involved here. Thus, the computer is shown herein in abbreviated form, including only so much of the detailed elements as provide a clear and ready understanding of this invention.

Figure 3:
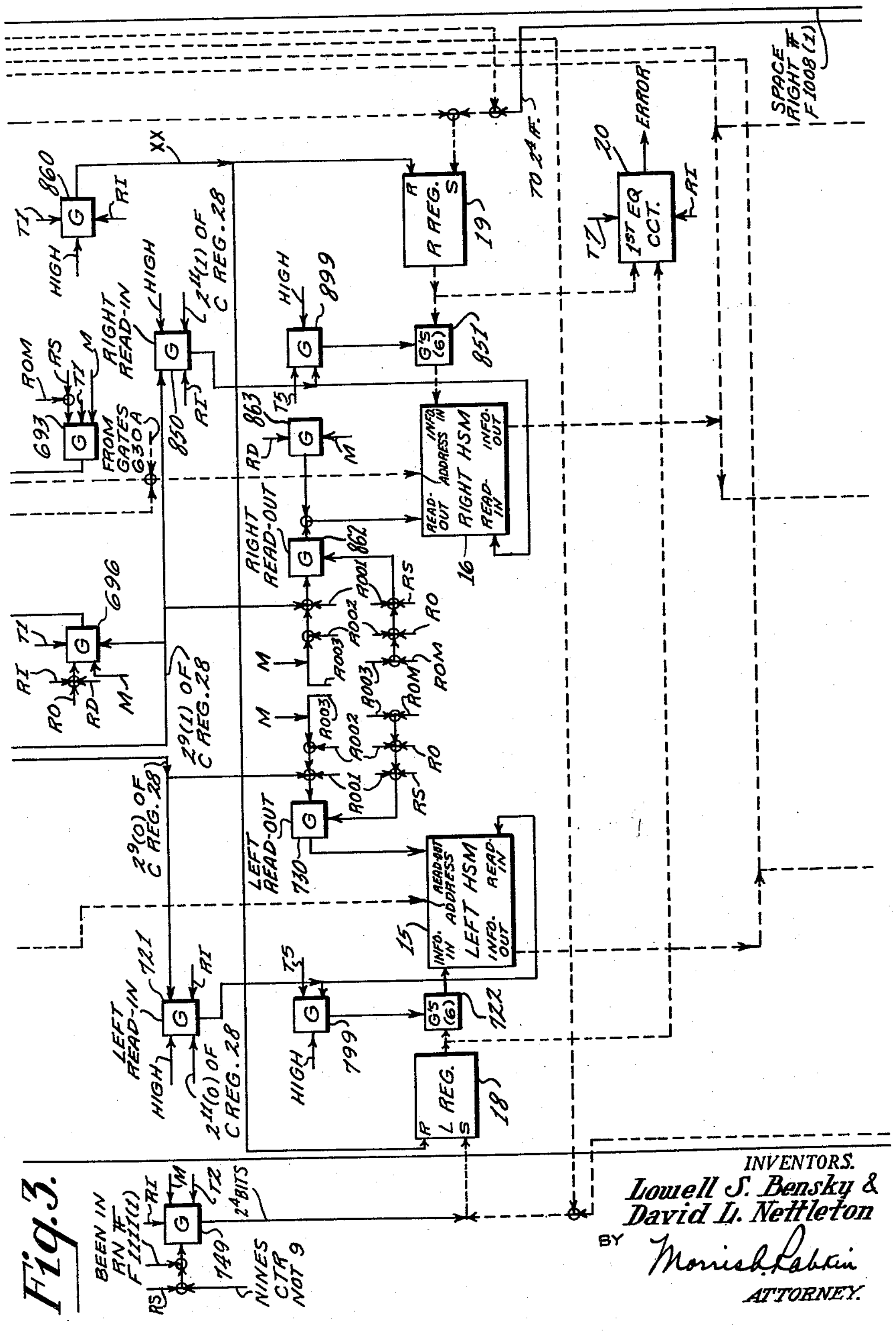

In this computer, the data upon which the computer acts may be stored in a static memory which, by way of example, may comprise two memory banks designated respectively, the left high speed memory 15 and the right high speed memory 16 (FIG. 3). Hereafter the abbreviation HSM is employed for the high speed memory. Each memory bank may be of the type employing magnetic cores and may be assumed to include address circuits. Each memory bank also includes read-out and write-in circuits which may be respectively actuated by pulses or high levels.

Upon the occurrence of a pulse at the appropriate circuit, the memory is placed in condition to read-in information applied to its information in circuits or the memory is placed in condition to supply information at its information out circuits (read-out). The information in or out is in the form of binary digits of information or bits as represented by an electrical signal (a voltage level) on one of several leads. Seven bits in this instance may be stored at each address and written in or read-out in parallel. However, one of these seven bits is a parity bit and is ignored in describing the present invention. As will appear more fully hereinafter a series of timing (that is, clock) pulses are provided in cycles of approximately 20 microseconds. It is assumed that the read-in and read-out circuits, although primed for addressing the location of the information, are further actuated internally only upon the occurrence of the timing pulse designated T5. In formation may be received from or fed out of the memory throughout the period from the fifth to the sixth timing pulses T5 to T6. In the alternative a vacuum tube type memory such as a selectron or any other type of random access memory may be employed.

It may be noted that the employment of two banks of the memory and the use of other certain details involved are not essential to the invention described and claimed herein. But these details are shown and described by way of clear, explicit and full example.

2.2 *Description of the circuits of FIGURE 1*

In a known manner, a program drum PD (FIG. 1) is supplied with a timing track and a reset track. The program drum PD is preferably a magnetic coated drum continuously rotated. As the drum rotates, pulses from the timing track are generated in reading heads positioned adjacent to the timing track. The pulses are in synchronism with lines of information written on the drum in the form of binary numbers magnetically stored in twelve data channels. With the occurrence of every other pulse from the timing track, a timing pulse generator TPG generates a series of nine timing pulses designated at T1 to T8 and T8*a*, respectively. The particular manner of generation of timing pulses is shown more fully in the said copending Bensky application and especially the manner whereby every alternate pulse from the timing track is suppressed. This latter feature, although highly useful in providing greater compression of information on the drum, requires no further description for the purposes of describing the present invention. The reset track on the program drum PD provides a fiducial pulse from which the lines on the drum are counted.

Six of the data channels on the program drum PD are read by six left reading heads and amplifiers 51 and the other six data channels are read by six right reading heads and amplifiers 52. A gate 150 receives the pulses from the reset track of the program drum PD and applies it to the reset terminal R of a drum counter DC.

The gates herein are all logical "and" gates, and are indicated by rectangles with the priming leads indicated by arrows directed toward the rectangle and the output by an arrow leaving the rectangle. The gate 150 is a two input "and" gate. In addition to the input from the reset track another input to the gate 150 is indicated which, for the purposes of the present application, may be considered always high (having a high voltage level), and the gate therefore always open. The drum counter may be a counter of twelve stages.

Each of the counters and registers herein may be flip-flop counters or registers. The trigger terminal T of the drum counter DC receives the output of an "or" circuit. This "or" circuit receives two inputs. One, the first timing pulse T1 and the other, the fifth timing pulse T5. In the drawing of this application as in the Bensky application, a special convention is adopted for the showing of an "or" circuit. According to this convention the inputs to the "or" circuit are indicated by arrowheads converging to a point which is the center of a small circle.

A drum address is provided containing twelve (12) bits of address information. This input is merely indicated by the letters "Drum Address" since this particular function is not deemed essential for the purposes of describing the present invention. This drum address may, for example, be provided by a counter or a register having 12 flip-flop stages such as is described in the above-mentioned Bensky application. The 12 bits of address information from the drum address are applied to 12 inputs of an equal circuit 50. Another 12 inputs to the equal circuit 50 are from the 12 flip-flop stages of the drum counter DC.

A flip-flop is a circuit having two stable states, that is conditions, and two input terminals, one of which may be designated as a reset, the other set. The flip-flop may assume the set condition by application of a high level (or pulse) on the set input terminal S or the reset condition by the application of a high level (or pulse) on a reset terminal R. Two outputs are associated with the flip-flop circuit which are given the Boolean tags of "one" and "zero." If the flip-flop is in its set condition (that is, set) the "one" output voltage is high and the zero output voltage is low. Unless otherwise indicated, the outputs from the flip-flop are taken from the "one" terminal. If the flip-flop is reset (that is in its reset condition) the "one" terminal is low and the "zero" terminal is high. A flip-flop may also be provided with a trigger terminal T. Application of pulses to the trigger terminal T causes the flip-flop to assume the other condition from the one it was in when the pulse was applied. Counters are formed from flip-flops in a known manner.

In the drawing of this application, multiple leads are indicated by dotted lines. Each of these multiple leads carries, as the machine operates, a binary digit of information having only two possible voltage levels, one high, and one low. Therefore the lines themselves are sometimes designated as bits (binary digits of information).

The equal circuit 50 may comprise a group of "and" gates, one for each pair of output leads from the corresponding bits of input information from the drum address and the drum counter DC, respectively. The outputs of each of the 12 "and" gates are then applied to a single "and" gate. Accordingly, the equal circuit 50 has a pulse output, if and only if, the binary number of the address is the same as the binary number of the drum counter DC.

A drum line match flip-flop F125 receives at its set terminal S the output of the equal circuit 50. Note that the stylized double F is employed in the drawing to indicate a flip-flop. The output of a three input gate 243 is coupled to the reset input of the drum line match flip-flop F125. Inputs to the three input "and" gate 243 are received from the eighth delayed timing pulse T8*a*, from the status level IC (FIG. 5), and from a third input lead, herein designated by the symbol "high." The high designation is given since, throughout the multiply operation, which is the subject of this invention, a high input voltage level is maintained at that particular input.

Several status levels, such as IC, are provided, only one of which is high at any given time. The selection and provision of the various status levels will be described in greater detail hereinafter in connection with FIG. 5. For the present, it is sufficient to note that among the status levels provided in the interest of the present application are those designated as follows:

R001, R002, R003, RS, RI, ROM, RO, RN, RD, and IC

The one output from the drum line match flip-flop F125 is applied to a gate 142, to a gate 242, and to one of the inputs to the timing pulse generator TPG. In this application, junctions between leads are indicated by an arrowhead at the junction, which indicates the direction of electrical signal or information flow. Each of the gates 141 and 242 is a two input gate and receives as the second input the second timing pulse T2. It may be noted that the gates 142 and 242 provide the same output and their function could be combined to one gate. Such a combination could also be made in other instances contained herein. The output of gate 142 is applied to both the left and right reading heads and amplifiers 51 and 52 and may be considered to control, or gate, the outputs of the reading heads and amplifiers.

The output of the gate 242 is coupled through an "or" circuit to the trigger input terminal T of a six stage counter designated as a program sub-counter PSC. A two input "and" gate 244 also has its output coupled to the last mentioned "or" gate to the trigger input terminal T of the program subcounter PSC. This latter gate 244 receives as one input the second timing pulse T2. The second input is provided by the output of a three input "or" gate, the three inputs of which are R001, R002, and R003. The reset input to the program subcounter PSC is provided by the output of a two-input "or" circuit. One input to this "or" circuit is provided by the output of the three-input "and" gate 243. Thus the program subcounter PSC reset simultaneously with the drum line match flip-flop F125. The other input to the "or" circuit is provided by the output of a two-input gate G239. The two inputs to the gate G239 are supplied by the status level R003 and the timing signal T7, respectively.

Figure 5:
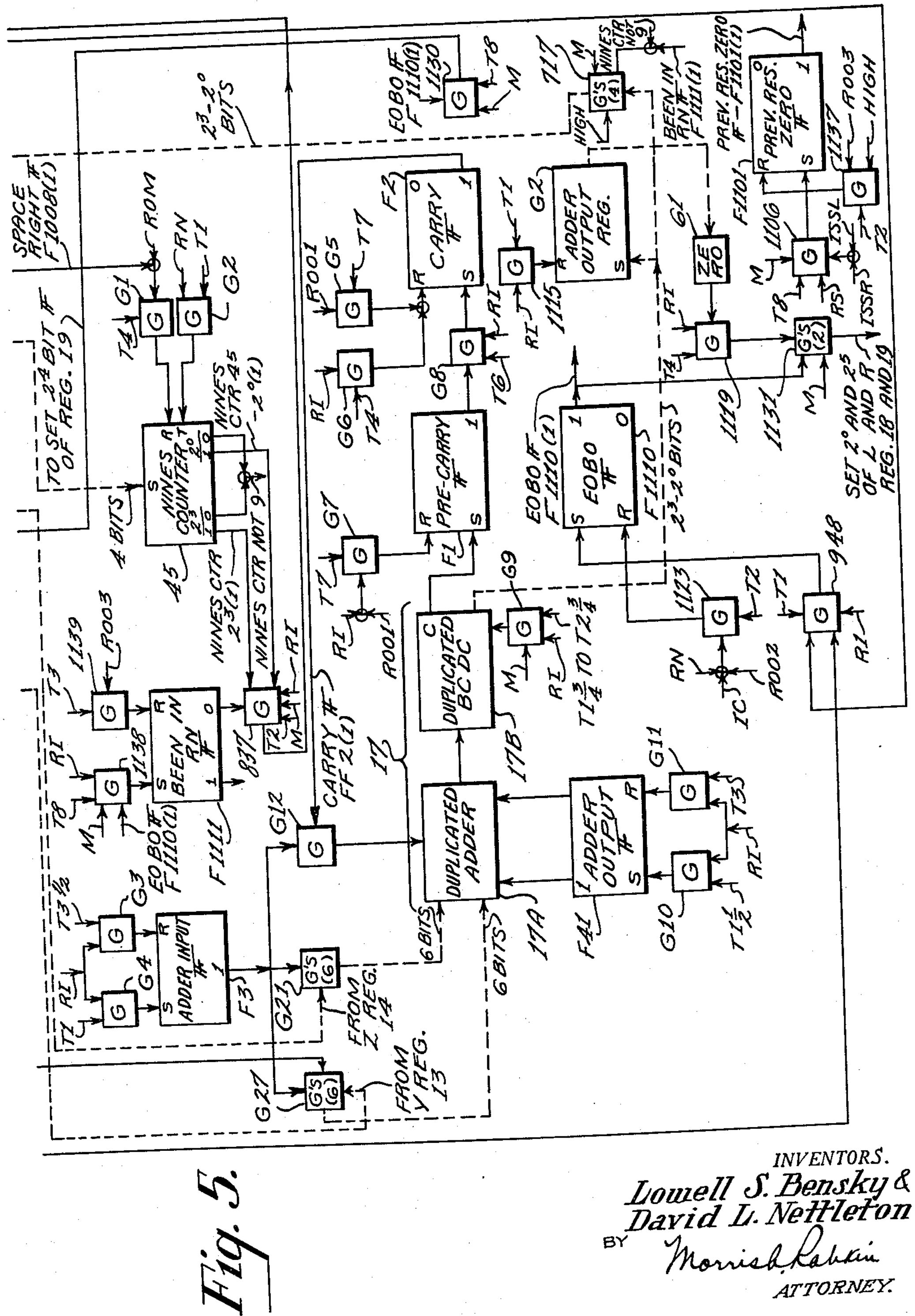
FIGURE 5 is at the bottom below FIGURE 4.

A first set of six two input "and" gates 630 are provided and a second set of six two input "and" gates **630*a* are provided. Each gate of the set of gates 630 and 630*a*, respectively, receives one input from the output of a two input "and" gate 629. Each of the gates 630 also receives a second input from respective one of six of the seven outputs of the program subcounter PSC (the seventh output, the parity bit, is ignored for purposes of this application as mentioned above). Also each of the six gates 630*a* receives one input from a different output of the seven stages of the program subcounter PSC. Note that between the gates 630 and 630*a* the output leads from the program subcounter are indicated as branched, a similar convention being employed for multiple leads as shown here. One input to the gate 629 is provided by the first timing pulse T1. The remaining input to the gate 629 is received from the output of an "or" circuit, the inputs to which are the status levels R001, R002, and R003 (FIG. 5). The outputs of each of the six gates 630 are coupled to the address circuits of the left HSM (FIG. 3) which will be descrbed in conjunction with FIGURE 3. Similarly, each of the six leads from the output of the gate 630*a* are coupled to the address circuits of the right HSM 16** (FIG. 3). This also will be described in conjunction with FIGURE 3.

An operations "0" register 30 of six stages is utilized. The different outputs of the "0" register are connected to control an operation matrix OM. The reset terminals R of the "0" register 30 receive the output of a two input "and" gate 1401. One input to the gate 1401 is from the status level R001, and the other input is from the first timing pulse T1. The set terminals S of the "0" register 30 receives the various outputs of a set of six gates 1402, each of which is a three input "and" gate. One input to each of the gates 1402 is provided by the status level R001 and a second input to each of the gates 1402 is provided by the sixth timing pulse T6. The third input to each of the gates 1402 is received from one of the six output leads of the left HSM 15. The operation matrix OM is a matrix which selects a different output lead depending on the six bits entered into the "0" register 30. The particular output of the operation matrix of interest in this application, namely, multiply, is indicated as an operation level M. The other outputs of the operation matrix are of interest with respect to other operations which the entire system may perform. The operation matrix therefore selects the operation to be performed by the computer in response to a coded input from the "0" register 30 which input may be withdrawn from either the left or right HSM 15 or 16 (FIG. 3) as described hereinafter.

Figure 2:
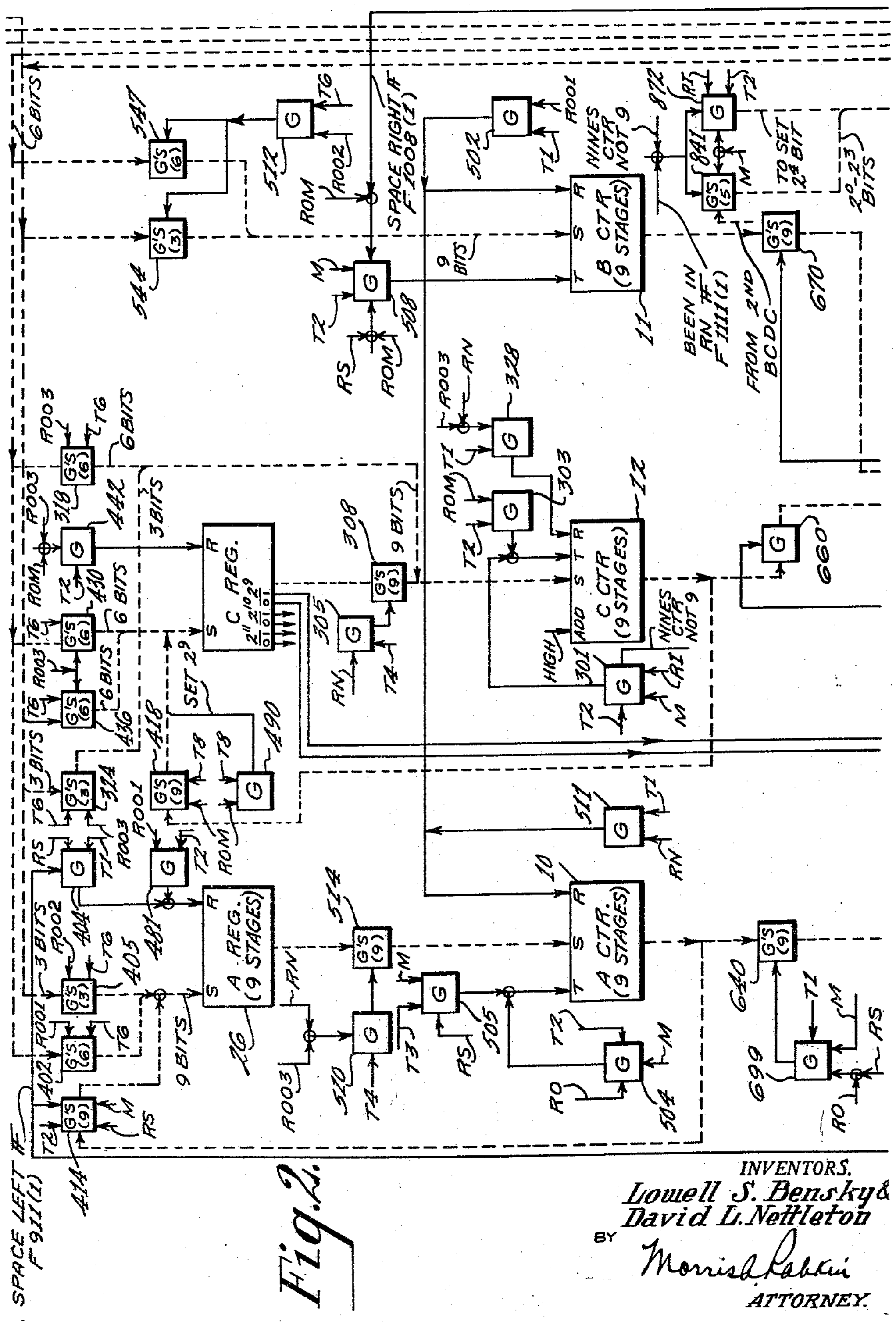

2.3 *Description of circuits of FIGURE 2*

Reference is made to FIGURE 2 which is to be placed immediately below and adjacent to FIGURE 1 as is indicated by the block diagram of FIGURE 8. With this particular layout, the lines from FIGURE 1 to FIGURE 2 are continuous.

Figure 4:
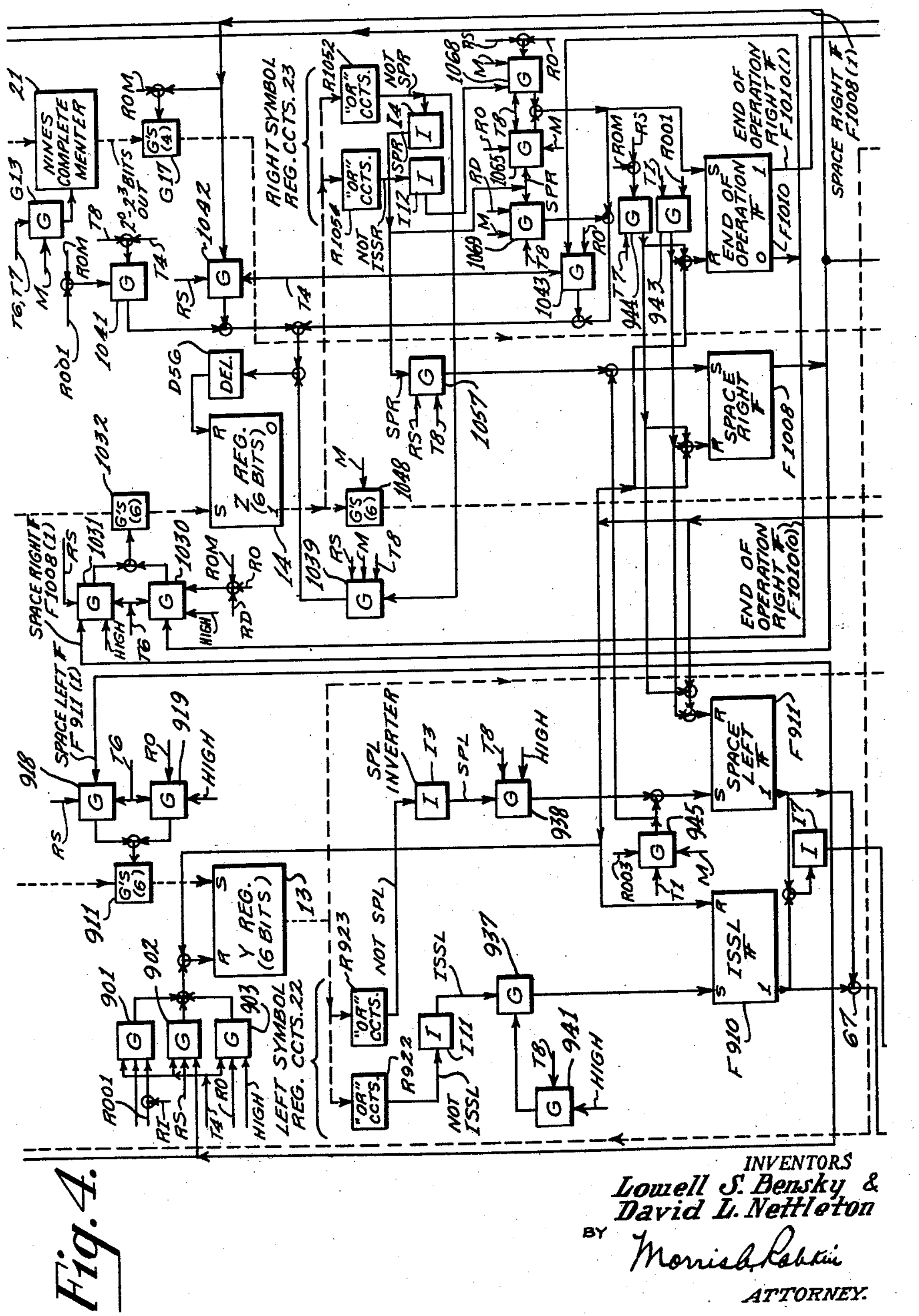

The reset terminals R of an A register 26 receive the output of a two input "and" gate 481 through an "or" circuit arrangement. One input to the two input "and" gate 481 is the status level R001, and the other input to the two input "and" gate 481 is the second timing pulse T2. Also connected into the reset input of the A register through the "or" circuit arrangement is a three input "and" gate 404. The first input to the "and" gate 404 is provided by the first timing pulse T1. The second input to this gate is provided by the status level RS. Third input to the three input "and" gate 404 is received from a space left flip-flop F911 (FIG. 4).

The six low order stages of the set terminals of the A register 26 receive the outputs of a set of six three input gates 402. One input of each of the gates 402 is from the status level R001 and the second input of each gate is from the sixth timing pulse T6. The third input to each of the six gates 402 is from the six respective outputs from the right HSM 16 (FIG. 3). The remaining three terminals S of the A register 26 receive, respectively, the outputs of a set of three input "and" gates 405. One of the inputs to the gates 405 is a status level R002 and a second input to each of the gates 405 is a sixth timing pulse T6. The remaining (third) input to the gates 405 is respectively from three of the six bits of the output from the left HSM 15 (FIG. 3). A set of nine five input "and" gates 414 have their output connected through the "or" circuit to the set input through an "or" circuit along with the outputs from the gates 402 and 405, respectively, to the set input of the A register 26. One input to each of the respective gates 414 is provided by the respective outputs of the A counter 10. Priming inputs to each of the gates 414 are supplied by the operation level M, the status level RS, the second timing pulse T2, and the "one" output of the space left flip-flop F911 (FIG. 4). Thus to summarize, the A register may receive nine bit inputs from either the set of gates 414 or the sets of gates 401 and 405, in combination.

The remaining three bits of the output from the left HSM 15 (FIG. 3), respectively, are applied to the three gates of a set of three, two input gates 544. Three of the higher order set terminals S, respectively, of a B counter 11 receive the three respective outputs of the gates 544. The set terminals S of the other six lowest order stages of the B counter 11 receive, respectively, the six outputs of a set of six two input gates 547. Each of the gates 547 receive one input from each of the six outputs of the right HSM 16 (FIG. 3). Second inputs to each of the gates 544 and to the each of the gates 547 are from the output of the two input "and" gate 512. One input to the gate 512 is from the status level R002 and the other input to the two input "and" gate 512 is from the sixth timing pulse T6.

A twelve stage C register 28 and a nine stage C counter 12 are provided. The six lowest order stages of the C counter 12 have their respective set terminals S connected to receive the outputs of a set of six two input "and" gates 318. Similarly, the set terminals S of the six lowest order stages of the C register 28 are connected to receive the outputs of a set of six three input "and" gates 430. Each gate of a set of gates 318 and 430 receives as one input the status level R003, and at the second input the sixth timing pulse T6. Further, each of the sets of six gates 318 and 430, respectively, receive as their third inputs the six outputs of the right HSM 16, respectively.

The remaining three high order set terminals S of the C counter 12 are connected, respectively, to receive the outputs of a set of three, three input "and" gates 324. The gates 324 have as one input the status level R003, and as the second input the sixth timing pulse T6. In this instance, the third input to each of the gates 324 is from the respective three lowest order outputs of the left HSM 15. These three outputs of the left HSM 15 are also supplied to three lower order gates of a set of six three input "and" gates 436. The remaining three outputs from the left HSM 15 are applied to the other three gates of the set of six gates 436 which have their output terminals connected, respectively, to the set terminals S of the three highest order stages ($2^9$, $2^{10}$, $2^{11}$) of the C register 28. The other three outputs of the set of six gates 436 are connected to the remaining set terminals S, respectively, of the remaining three stages of the C register 28, namely, $2^6$, $2^7$, and $2^8$ bits, respectively. The remaining two inputs to each of the gates 436 are from the status level R003 and the sixth timing pulse T6.

Although the outputs from the memory banks are apparently read into many places at once, the fact is these outputs are distributed during the different status levels. Note, for example, that the entry to the nine lowest order stages of the C register 28 is the same and is made at the same time as that to the nine stages of the C counter 12 and from the same memory outputs.

The reset terminals R of hte C register 28 receive the output of the two input "and" gate 442. Two inputs to this "and" gate 442 are provided by the second timing pulse T2 and the status level R003. Reset terminals R of the B counter 11 are connected to receive the output of a two input "and" gate 502. The gate 502 receives inputs from the first timing pulse T1 and from the status level R001. The output of "and" gate 502, in addition to being coupled to the reset input of the B counter 11, is also connected to the reset terminal R of the A counter 10.

The reset terminals R of the C counter 12 are connected to receive the output of a two input "and" and gate 228 having as one of its inputs the status level R003 and the and the second of its inputs the first timing pulse T1. As is described more fully in the said copending Bensky application, the C counter 12 is a true counter made up of flip-flops and is reversible. However, for the purposes of the present application, it may be assumed that the C counter 12 is always in its additive state and counts up. Thus the input to the add portion of the C counter is merely indicated by a high level input. In this manner, as will be later described more fully, the C counter will count upward from the least significant digit address of the partial product during the multiply operation. The trigger input to the C counter 12 is supplied by a four input "and" gate 301. The four inputs to the gate 301 are received, respectively, from the operation level M, from the status level RI, the second timing pulse T2, and finally from the nines counter not-nine output (FIG. 5), respectively. Also providing an input through an "or" circuit along with the output from gate 301 to the trigger terminals T of the C counters 12 is a two input "and" gate 303 receiving its priming inputs from the second timing pulse T2 and from the status level ROM.

The nine bit outputs from the A register 26 are each connected to one of the inputs of a set of two input "and" gates 514. Remaining inputs to each of the two input "and" gates 514 are provided by the output of another two input "and" gate 510. Two inputs to the "and" gate 510 are, respectively, the status level R003, and the fourth timing pulse T4. The nine low order bits from the C register 28 are applied to each respective gate of a set of nine two input "and" gates 308. "And" gates 308 are primed by an additional gate 305 receiving priming inputs in turn from the status level RN and the fourth timing pulse T4. The output of the gate 308 is connected through an "or" circuit along with the outputs of gates 318 and 324, respectively, to the respective set terminals of the C counter 12.

The output of the C counter is connected to the respective inputs of each of two sets of gates 660 and 418 respectively. Gates 660 are each primed by the output of a gate 696 (FIG. 3). The gate 696 (FIG. 3) receives priming inputs from the operation level M, the first timing pulse T1, and from the one side of the $2^9$ bit stage of the C register 28. The final priming input to the gate 696 is provided by the output of an "or" circuit receiving inputs from any one of the status levels RI, RO, or RD, respectively. Each of the gates 418 along with the gates 490 are primed by the status level ROM and the eighth timing pulse T8. Gate 418 provides an output from the output of the C counter through an "or" circuit to the set inputs of the C register 28. Similarly, the output of gate 490 is connected to the $2^9$ bit stage of the C register 28.

The trigger terminals of the A counter 10 receive inputs from the outputs of an "or" circuit receiving inputs from the gates 504 and 505. The gate 504 receives priming inputs from the operation level M, the status level RO, and the second timing pulse T2. On the other hand, the gate 505 is primed by the operation level M, the status level RS, and the third timing pulse T3 to provide the triggering output to the A counter 10. Similarly, the trigger inputs to the B counter 11 are provided by the output of a four input "and" gate 508. The gate 508 is primed by either of the status levels RS or ROM. Additionally, the gate 508 is primed by the second timing pulse T2, the operation level M, and by either the status level ROM, or the "one" output of the space right flip-flop F1008 (FIG. 4). The reset inputs to each of the stages of the A counter 10 and the B counter 11 is also actuated by the output of a two input gate 511 receiving inputs from the status level RN and the first timing pulse T1. The outputs from the A counter 10 provide the inputs, respectively, to each of the nine sets of two input gates 640, as well as to one of the inputs of each of the set of nine gates 414 as mentioned above. The remaining input to the set of terminals of the two input gates 640 is received from the three input gate 699. One of the inputs to the gate 699 is received from the output of an "or" circuit having inputs from the operation level M, the first timing pulse T1 and from the output of an "or" circuit receiving inputs from either of the status levels RO or RS.

In a similar manner the nine bit outputs from the B counter 11 are connected to the inputs of nine sets of two input "and" gates 670. Remaining inputs to each of these "and" gates 670 is received from the output of a three input gate 693 (FIG. 3). Referring to FIG. 3, these three inputs to gates 693 are seen to be from the operation level M, the first timing pulse T1, and from the output of an "or" circuit receiving inputs from either the status levels ROM or RS.

Also seen in FIGURE 2, are a pair of gates 841 and 872. Each of these gates receives the output of an "or" circuit which in turn receives inputs from either the "been-in RN" flip-flop F1111 (FIG. 5) or from the nines counter not-nine logical output from the nines counter (FIG. 5). Similarly, each of the gates 841 and 872 receive priming inputs from the operation level M. Each of the five gates 841 comprising the set receive these latter two priming inputs. Each of the set of five gates 841 also receives an input from the second binary coded decimal converter 17B (FIG. 5). The gate 872 receives additional priming inputs from the RI status level, and the second timing pulse T2. The output of the gate 872 is connected through an "or" circuit to the set input of the $2^4$ bit of the R register 19 (FIG. 3). Similarly, each of the gates 841 is connected to their respective set inputs of the R register 19 (FIG. 3).

The gates 660 and 670 (FIG. 2) respectively, connect outputs of the C counter 12 and the B counter 11 through an "or" circuit along with an input from the gates 630*a* (FIG. 1) to the address input of the right HSM 16. In a similar manner gates 640 connect the output of the A counter to the address input of the left HSM 15 (FIG. 3).

2.4 *Description of the circuits of FIGURE 3*

Figure 8:
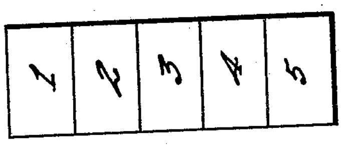
FIGURE 8 is a drawing showing the manner in which the FIGURES 1 to 5 are to be placed to form a complete drawing of this invention. When placed in the proper order

Reference is made to FIGURE 3 which is to be placed immediately below FIGURE 2 as indicated in FIGURE 8 so that the lines from FIGURE 2 to FIGURE 3 are continuous. In FIGURE 3, portions of the left hand side and portions of the right hand side of the figure are nearly symmetrical, that is, the circuits are similar and perform similar functions. Therefore, only the left hand portion of the figure is described in detail and the corresponding parts, together with the differences and connections will be pointed out as the description progresses.

The left HSM 15 receives as inputs to its address circuits, as described above, the nine outputs from either of the two sets of two input gates 640 (FIG. 2) or 630 (FIG. 1) through "or" circuits.

A six bit input to the left HSM 15 information-in circuits (abbreviated in the drawing as info-in), is received from the six outputs of a set of gates 722. One input to each of the gates 722 is from the output of a three input gate 799. One input of the gate 799 is, for the purposes of this application, a continuous high level input. Remaining inputs to the gate 799 are provided by the fifth timing pulse T5 and the output of a left read-in gate 721. One input to the left read-in gate 721 may be taken as always high, for purposes of the present application so that the left read-in gate 721 may be considered as always primed thereby. A second input to the left read-in gate 721 is taken from the "zero" output of the $2^{11}$ bit stage of the C register 28 (FIG. 2). The third input to the left read-in gate 721 is from the zero output of the $2^9$ bit stage of the C register 28 (FIG. 2). The fourth and final input to the left read-in gate 721 is from the RI status level.

Each of the gates 722 receive their second inputs respectively, from the six outputs of a left register 18, termed the L register. Six outputs of the six left reading heads 51 (FIG. 1) are applied through "or" circuits to the six set terminals S respectively, of the L register 18 (FIG. 3). Additional inputs to the set terminals S of the R register 18 are received from the output of a set of six gates 717 (FIG. 5) which couple the output of the first binary coded decimal converter 17*b* (FIG. 5) to the L register 18 set input. The final input for the L register 18 is from the output of a gate 749 (FIG. 3) to the fifth stage ($2^4$ bit) of the L register 18. The gate 749 receives priming inputs from the second timing pulse T2, the operation level M, and the status level RI. A final priming input is received from the output of an "or" circuit receiving inputs from either the "one" output of the "been-in RN" flip-flop F1111 (FIG. 5) or the output of a second "or" circuit. The second "or" circuit receives inputs from either the RS status level or from the nines counter not-nine output from the nines counter 45 (FIG. 5).

The read out circuits of the left HSM 15 are actuated by the output of a left read-out gate 730. The left read-out gate 730 is activated by two inputs from the outputs of two "or" circuits, respectively. The first of these "or" circuits receives inputs from either the status levels R001, or RS. The final alternative input to this last mentioned "or" circuit is provided by the output of a second "or" circuit receiving inputs from either the status levels R002, RO, or from the output of a third "or" circuit. This third "or" circuit may receive the outputs of either the R003 status level, or the ROM status level. The remaining input to the left read-out gate 730 is also received from the output of an additional plurality of "or" circuits. The first "or" gate of this additional plurality receives inputs from the R001 status level, from the "0" output of the $2^9$ bit of the C register 28, or from the output of an additional "or" circuit receiving inputs from the R002 status level, R003 status level, or the operation level M.

By way of summary, the left read-out gate has a high output whenever any one of the status levels R001, R002 and R003 is high. The left read-out gate 730 is also actuated during the operation level M (multiply) when any of the RS, RO, or ROM status levels are high. Components in the right hand portion of FIGURE 3, corresponding to those in the left hand portion, are as follows: the right HSM 16 corresponds to the left HSM 15; the right register 19 corresponds to the left register 18; however, an exception exists in that the set terminals S of the R register 19 receive the output of the right reading heads 52 (FIG. 1). Further, gates 851 correspond to the gates 722; gate 899 corresponds to the gate 799; also the right read-in gate 850 corresponds to the left read-in gate 721. Another exception exists here in that the right read-in gate 850 receives an output from the one terminal rather than the zero terminal of the $2^{11}$ and $2^9$ bits, respectively, of the C register 28.

A three input gate 860 is provided having an output which is applied to the reset terminals R of both the L register 18 and the R register 19. This last-mentioned output is designated as XX. The gate 860 has its first input from the status level RI. Second and third inputs, respectively, are from the first timing pulse T1 and an input which may be designated as continuously high, for purposes of this application. The right read-out gate 862 corresponds to the left read-out gate 730 to provide an output whenever any one of the status levels R001, R002 or R003 is high. In addition, high status levels ROM, RO, or RS also provide an output during the high operation level M. A gate 863 is connected through an "or" circuit along with the output of the right read-in gate 862 to the read-out circuitry of the right HSM 16. The gate 863 is a two-input gate receiving these inputs from the operation level M and the status level RD.

The outputs of the L register 18 and the R register 19, in addition to being connected through the gates 722 and 851, respectively, to the left and right HSM 15 and 16, respectively, are also connected to a first equality circuit 20. This first equality circuit 20 is actuated by the seventh timing pulse T7, to generate an error signal when the results of the first and second binary coded decimal converters 17*b* (FIG. 5) are unequal. A second priming input to the first equality circuit 20 is received from the RI status level. Thus, the equality circuit 20 will compare the two results of a sum produced in each of the adders (converted by the binary coded decimal converters 17*b* (FIG. 5)), the results of which are stored in the left and right registers 18 and 19 (FIG. 3) during this RI cycle, upon the occurrence of the seventh timing pulse T7. In the event of inequality, an error signal may be generated to be used to indicate error as desired.

2.5 *Description of circuits of FIGURE 4*

Reference is made to FIGURE 4 which is to be placed immediately below FIGURE 3 as indicated in FIGURE 8 so that the lines from one figure to the other are continuous.

In the description of this figure as in the description of FIGURE 3, since the left and right halves of the figure contain a great deal of symmetrical components, a description will be given only of the left side. Then comments will be made as to the similarities, changes, or additions necessary in the right side of FIGURE 4.

A Y register 13 of six stages is provided. The set input terminals S of the Y register 13 receive the output from the left HSM 15 through a set of six, two input "and" gate 911. Remaining inputs to each of the "and" gates 911 is provided by the output of an "or" circuit having inputs from the outputs of two gates 918 and 919, respectively. Gate 918 receives an input from the sixth timing pulse T6, from the status level RS, and from the "one" output of a space left flip-flop F911 (FIG. 4). The gate 919 receives inputs during the RO status level and from the sixth timing pulse T6. A third input to the gate 919, for the purposes of this invention, may be considered as always having a high level or condition.

The outputs of three gates 901, 902, and 903, respectively, are each coupled through an "or" circuit to the reset input of the Y register 13. Each of the gates 901, 902, 903, respectively, receive a priming input from the fourth timing pulse T4. The first of these gates 901 receives additional priming inputs from the status level R001 and from the output of an "or" circuit receiving inputs from the status levels R001 or RI. The second of these gates 902 receives additional priming inputs from the RS status level and from the one output of the space left flip-flop F911. The third of these gates 903, receives additional priming inputs from the RO status level and from an additional input which may be considered high for the purposes of this invention.

The output of these three gates 901, 902, and 903, as mentioned above, is coupled through an "or" circuit to the reset input of the Y reigster 13. Also coupled to the reset input of the Y register 13 along with the output of the above mentioned "or" circuit is the output of a gate 1130 (FIG. 5). The gate 1130 receives priming inputs from the eighth timing pulse T8, the operation level M, and from the one output of the EOBO flip-flop F1110 (FIG. 5). The output of the gate 1130 is also connected to several other locations. Among these locations, are the reset input of the space left flip-flop F911, the reset input of the ISSL flip-flop F910 (FIG. 4), the reset terminal of the space right flip-flop F1008, and the rest input of the end of operand right flip-flop F1010.

The outputs of each of the six stages of the Y register 13 are connected to the respective inputs of each of a set of six gates G27 (FIG. 5), thence to be coupled to one of the inputs of the duplicated adder and binary coded decimal converter circuits 17 (FIG. 5). Each of the six bits of the Y register is also connected to a group left symbol recognition circuits 22. These symbol recognition circuits 22 comprise two "oro" circuits R922 and R923. Each of the "or" circuits R922 and R923 receives a different one of the six inputs from each of the six stages of the Y register 13. The first of the "or" circuits R922 recognizes the absence of an item separation symbol in the Y register. Thus the output of the gate R922 is termed NOT ISSL. This NOT ISSL output is connected to the input of an inverted I11. Due to the functioning of the inverter I11, its output indicates the presence of an item separator symbol in the Y register. Thus the output of the inverter I11 is termed ISSL and provides a high level signal when an item separator symbol is received in the Y register from the left HSM 15 (FIG. 3). Accordingly, this ISSL output lead is high, if and only if, the inputs to the recognized NOT ISSL gate, R922 receives a coded item separation symbol.

Continuing, the ISSL output is applied to a two input gate 937. A second input to the gate 937 is provided by the output of a gate 941. One input to the gate 941 is in turn provided by the eighth timing pulse T8. For the purposes of this application, the remaining input to the gate 941 may be considered to have a continuous high level input. The output of gate 937 is connected to the set input of the ISSL flip-flop F910. The symbol recognition circuit contained in the symbol recognition circuits R923 are termed space recognition circuits. The logic herein utilized is again an inverted type logic. These logical "or" circuits are arranged so that an output is provided, if and only if, their inputs from the Y register is not a coded space symbol. This NOT SPL lead is applied to an inverter I9 and the output of the inverter is designated SPL. Accordingly, the SPL output lead is high, if and only if, the input to the recognized NOT SPL circuit (that is, the output of the Y register 13) is a coded space symbol. The SPL output of the inverter I9 is supplied to one input of a three input gate 938. The second input to the gate 938 is provided by the eighth timing pulse T8. Third input to the gate 938 may, for the purpose of this application, be considered as always high. The output of the gate 938 is connected through an "or" circuit to the set input of the space left flip-flop F911.

The components from the right-hand portion of FIGURE 4 corresponding to those of the left hand portion are as follows: Z register 14 corresponds to the Y register 13; gate 1032 corresponds to the gate 911; gates 1030 and 1031 correspond, respectively to gates 919 and 918, with the exception that certain of the logical inputs for two gates 1030 and 1031, respectively, are different. Thus, both gates 1030 and 1031 receive priming inputs from the sixth timing pulse T6. Also gate 1031 receives a priming input from the status level RS, but in this case, the gate 1031 receives additional priming inputs from the "one" output of a space right flip-flop F1008, and from another input which may be considered as always high. Similarly, the gate 1030 receives a priming input from the "zero" output of the end of operand right flip-flop F1010, from another priming input which may be considered always high, and from a final priming input which receives the output of an "or" circuit. This "or" circuit may receive inputs from the ROM, RO, or RD status levels. Additional similarity between the right-hand portion and left-hand portions of FIGURE 4 are that the right symbol recognition circuits 23 correspond to the left symbol recognition circuits 22, recognition gate R1054 correspond to the recognition circuits R922, and recognition gates R1052 correspond to the recognition gates R923. Similarly, the inverters I12 and I4, respectively, correspond to the inverters I11 and I3, respectively, the space right flip-flop F1008 correspond to the space left flip-flop F911. At this point, the basic symmetry and correspondence ends.

Considering now the remaining portions of FIGURE 4 separately, a four input gate 1039 is connected through a delay circuit D56 to the reset input of the Z register 14. Four inputs to the gate 1039 are provided by the NOT SPR output of the recognition gates R1052, the eighth timing pulse T8, the operation level M, and the status level RS. Also connected through the delay circuit D56 to the reset terminals R of the Z register 14 through a plurality of "or" circuits are the gates 1041, 1042, 1043, 1065, 1068, and 1069. Gate 1041 is a two-input gate connected to receive the priming inputs from both of the outputs of two "or" circuits. The first of these "or" circuits receives inputs from the R001 status level, or from the ROM status level. The second of these "or" circuits receives inputs from either the fourth timing pulse T4 or the eighth timing pulse T8. The gate 1042 is also connected to receive inputs from the status level RS, from the "one" output of the space right flip-flop F1008, and from the fourth timing pulse T4.

Gate 1043 is a three-input gate receiving the first of the three inputs from the fourth timing pulse T4. The second of the inputs is derived from the status level RO, whereas the third and final input is derived from the "zero" output of the end of operand right flip-flop F1010. The gate 1069 is a four input gate receiving inputs from the operation level M, the status level RD, and the eighth timing pulse T8. The fourth and final input to the gate 1069 is received from the SPR output of the inverter I4.

The outputs of the gates 1065 and 1068, respectively, are connected through an "or" circuit, not only to the Z register 14, but also to the set input of the end of operand right flip-flop F1010. These gates 1065 and 1068, respectively, receive a common input from the eighth timing pulse T8, and from the operation level M. In addition, the gate 1065 receives priming inputs from the RO status level and from the SPR output of the inverter I4. Similarly, the gate 1068 receives additional priming inputs from the ISSR output of the inverter I12, and from the output of an "or" circuit receiving inputs from either the status levels RO or RS. The output of the Z register is connected through a set of two-input gates 1048 to the input of a set of six gates G21. The additional input to each of the gates 1048 is provided by the operation level M.

The SPR output from the inverter I4 is also coupled to prime the gate 1057. Gate 1057 receives additional inputs from the RS status level and the eighth timing pulse T8. In turn, the output of gate 1057 is coupled through an "or" circuit to the set input of the space right flip-flop F1008. Also coupled through this "or" circuit to the set input of the space right flip-flop F1008 is the output of a gate 945. The output of gate 945 is also coupled through another "or" circuit along with the output of gate 938 to the set input of the space left flip-flop F911. The gate 945 is a three input gate receiving these three inputs from the operation level M, the first timing pulse T1, and the status level R003.

The output of the right HSM 16 (FIG. 3) is also coupled to the input of a nines complementer 21. The nines complementer 21 receives a priming input from the output of a two input gate G13. The two input gate G13 receives inputs from the sixth and seventh timing pulses T6—T7, and from the operation level M. The respective outputs of the nines complementer 21 are coupled to the corresponding inputs of a set of four gates G17. The nines complementer 21 accepts a binary coded decimal digit and produces the nines complement of the digit. This complementer 21 may be of the kind described, for example, in the application of Spielberg and Sublette, Serial No. 337,572, filed February 18, 1953, entitled "Code Converter System," and issued July 9, 1957 as Patent No. 2,798,667 and which is assigned to the assignee of this invention. The priming inputs to each of the gates G17 is received from the output of an "or" circuit. This "or" circuit receives inputs from either the ROM status level or from the output of the space right flip-flop F1008. In turn, the output of each of the gates G17 is connected to the set inputs of a nines counter 45 (FIG. 5).

A gate 944 receives inputs from the seventh timing pulse T7 and from the output of an "or" circuit receiving inputs from the ROM status level or the RS status level. In turn, the output of gate 944 is coupled through a plurality of "or" circuits to the reset inputs of each of the end of operand flip-flop F1010, space right flip-flop F1008, and the space left flip-flop F911. Another gate 943 receives priming inputs from the first timing pulse T1, and from the status level R001. The output of the gate 945 is similarly connected through a plurality of "or" circuits to the reset inputs of the end of operand right flip-flop F1010, to the space right flip-flop F1008, and to the space left flip-flop F911.

The "one" output of both the ISSL flip-flop F910 and the space left flip-flop F911 are connected through an "or" circuit to an inverter I7. The output of the inverter I7 is connected to each of the set of six gates G27 (FIG. 5). The particular connection herein will be described in more detail with reference to FIGURE 5. In addition each of the "one" outputs from the ISSL flip-flop F910 and the space left flip-flop F911 are connected through an "or" circuit 67 to provide a priming input to a four-input gate 948 (FIG. 5). Here again, these connections will be described in more detail in the discussion with respect to FIGURE 5. In a similar manner, the "one" output of the end of operand right flip-flop F1010 (FIG. 4) provides a second priming input to this same gate 948 (FIG. 5). The remaining two inputs to the four input gate 948 (FIG. 5) are provided by the first timing pulse T1 and the status level RI. The output of gate 948, in turn, is connected to the set input of a EOBO flip-flop F1110 (FIG. 5).

Note that there is no ISSR flip-flop corresponding to the ISSL flip-flop F910.

2.6 *Description of circuits of FIGURE 5*

The drawing of FIGURE 5 is to be placed immediately below that of FIGURE 4 as indicated in the placement drawing of FIGURE 8 so that the lines between FIGURE 4 and those of FIGURE 5 are continuous.

As mentioned above, the output of the Y register 13 (FIG. 4) which holds the contents of the left HSM 15 (FIG. 3) is connected to the output of a set of six gates G27. Similarly, the output of the Z register 14 (FIG. 4) which holds the contents of the right HSM 16 (FIG. 3) is connected to a set of six gates G21. Each of the gates G27 and G21, respectively, receives a priming input from the output of an adder input flip-flop F3. A gate G4 has its output connected to the set input of the adder input flip-flop F3, and a second gate G3 has its output connected to the reset terminal of the adder input flip-flop F3. Each of the gates G4 and G3 receives a priming input from the status level RI. The first gate G4 receives its second priming input from the first timing pulse T1 whereas the second gate G3 receives its second priming input from a delayed third timing pulse designated T31/2. The output of each of the two sets of six gates G27 and G21, respectively, are coupled to the inputs of an arithmetic unit 17.

The arithmetic unit comprises first a duplicated binary adder 17*a* and a duplicated binary coded decimal converter 17*b*. These units receive as inputs the two characters to be added during the sub-sequences of multiplication in binary coded decimal form along with the previous carry, and provide, as an output, a sum in the form of a binary coded decimal digit and a carry (if any). Whereas a single adder and a single binary coded decimal converter may be utilized, duplicates are herein illustrated in order to provide for checking of the results by duplicate addition and conversion.

The adders 17a may be any of the well known three input type binary adders. Similarly, the binary decimal converter, may for example, be of the type as disclosed in an application entitled "A Code Converter" by Ivan H. Sublette, Serial No. 307,253, filed August 30, 1952, now abandoned. The adders 17a are gated by the output of an adder output flip-flop F41. Two two-input gates G10 and G11, respectively, have their output connected to the set and reset input terminals, respectively, of the adder input flip-flop F41. Each of the gates G10 and G11 receives an input from the status level RI. Gate G10 receives a second input from a delayed first timing pulse designated T1½ and the gate G11 receives its second input from the third timing pulse T3. A gating pulse to the binary coded decimal converter is provided by the output of a gate G9. This gate receives three inputs, one from the operation level M, another from the status level RI, and another during the range of timing pulses T1¾ to T2¾. The particular function of these gating circuits for the arithmetic unit 17, as well as for the carry circuits about to be described below, is described in some detail in conjunction with the adding of successive characters, in the said Bensky application.

The carry output of the binary coded decimal converter 17b is connected to the set input of a pre-carry flip-flop F1. The reset input to the pre-carry flip-flop F1 is received from the output of the gate G7. Gate G7 receives inputs from the seventh timing pulse T7 and from either of the status levels R001 or RI through an "or" circuit. The output of the pre-carry flip-flop F1 is coupled to one input of a gate G8. The gate G8 receives two additional priming inputs, one from the sixth timing pulse T6, the other from the status level RI. In turn, the output of the gate G8 is coupled to the set input of a carry flip-flop F2. The reset terminal of the carry flip-flop F2 receives the output of an "or" circuit having alternative inputs from either of two gates G5 or G6. The gate G5 receives inputs from the status level R001 and the seventh timing pulse T7. On the other hand, the gate G6 receives inputs from the status level RI and the fourth timing pulse T4. The output of the carry flip-flop F2 is coupled to an input of the gate G12. The output of gate G12 is coupled to the carry input of the arithmetic unit 17 and receives a second priming input from the output of the adder input flip-flop F3.

Returning back to the path of the flow of information, the sum output of the arithmetic unit 17 comprising the $2^0$ to $2^3$ bits is coupled to the set inputs of an adder output register 62 and to the input of a set of four gates 717. A gate 1115 provides the reset input to the adder output register G2. The gate 1115 receives two inputs, one from the status level RI, and the other from the first timing pulse T1. The output of the adder output register G2 is coupled to the input of a zero recognition circuit 61. The zero recognition circuit 61, may for example, comprise an "or" gate receiving inputs from each of the four channels from the adder output register G2. Thus, the zero circuit would produce an output if a high level (or "one") is present on any of the adder output register channels. The output of the zero circuit 61 provides a priming input to a three input gate 1119. Remaining inputs to the gate 1119 are provided by the status level RI and the fourth timing pulse T4. In turn, the output of the gate 1119 provides one of the priming inputs to each of a pair of gates 1131. The output of each of the gates 1131 is coupled to the $2^0$ and $2^5$ stages, respectively, of each of the L and R registers 18 and 19 (FIG. 3). The function of this gate is if a zero is recognized, to introduce a proper alpha-numeric code representing this fact to the two L and R registers 18 and 19. This is in accordance with the operation as described in the said Bensky application.

Two additional priming inputs to the gate 1131 are provided, one being from the operation level M, the other being from the "one" output of a EOBO flip-flip F1110. The output of gate 948, described above in conjunction with FIGURE 4, is connected to the set input of the EOBO flip-flip F1110. The reset input of the EOBO flip-flop F1110 is received from the output of a gate 1123. Gate 1123 receives two inputs, one from the eighth timing pulse T8, the other from the output of an "or" circuit receiving inputs from any of the status levels RN, IC or R002.

As mentioned above in conjunction with FIGURE 4, the output of the nines complementer 21 is coupled through a set of gates G17 to the set inputs of a nines counter 45. As will be described below, the nines counter 45 is used in the multiplication operation to keep track of the number of times the multiplicand has been added to the partial product. The reset input to the nines counter 45 (FIG. 5) is provided by the output of a two-input gate G1. These two inputs to the gate G1 are provided by the fourth timing pulse T4 and the output of an "or" circuit receiving inputs either from the "one" output of the space right flip-flop F1008 (FIG. 4) or from the status level ROM. Similarly, a two-input gate G2 provides the trigger input to the nines counter 45. Gate G2 receives two priming inputs, one from the status level RN, the second from the first timing pulse T1.

Only the outputs of the $2^0$ and $2^3$ stages of the nines counter are utilized for reasons which will be described more fully below. Thus, the "zero" outputs of each of the stages $2^0$ and $2^3$ are coupled to the inputs of an "or" circuit. The outputs of this "or" circuit provide an output indicating that the nines counter is not nine, and is so labeled for simplicity in the drawing. Similarly, the one output of each of the stages $2^0$ and $2^3$ (which equal nine) provide two of the priming inputs to a six-input gate 837. Three additional inputs to the gate 837 are provided by the operation level M, the status level RI, and the second timing pulse T2. The final input to the gate 837 is provided by the zero output of a flip-flop designated "been-in RN" flip-flop F1111. The output of this gate 837, which is coupled to the $2^4$ stage of the R register 19 (FIG. 3) functions, as will become more apparent below, to enter a "zero" into the R register 19 when the "been-in RN" flip-flop is zero and the nines counter is nine. The "one" output of the "been-in RN" flip-flip F1111 is merely indicated by the arrow. This output provides one of the priming inputs through an "or" circuit to the gate 717 which is connected to the output of the arithmetic unit 17. Also coupled to this "or" circuit to the gate 717 is the nines counter not-nine output. The remaining priming inputs to the gate 717 are from the operation level M and from a fourth input which is designated as high. The set of four gates 717 is, as mentioned above, coupled to the set inputs of the L register 18.

Returning to the "been-in RN" flip-flop F1111, its set input is received from the output of a four-input gate 1138. The first input to the gate 1138 is provided by the eighth timing pulse T8, the second input to this gate is provided by the operation level M, and the third and fourth inputs, respectively, to the gate 1138 are provided by the status level RI and the "one" output of the EOBO flip-flop F1110. The reset input to the "been-in RN" flip-flop F1111 is provided by the output of a two-input gate 1139. Two inputs to the gate 1139 are provided by the third timing pulse T3 and the status level R003.

Figure 6:
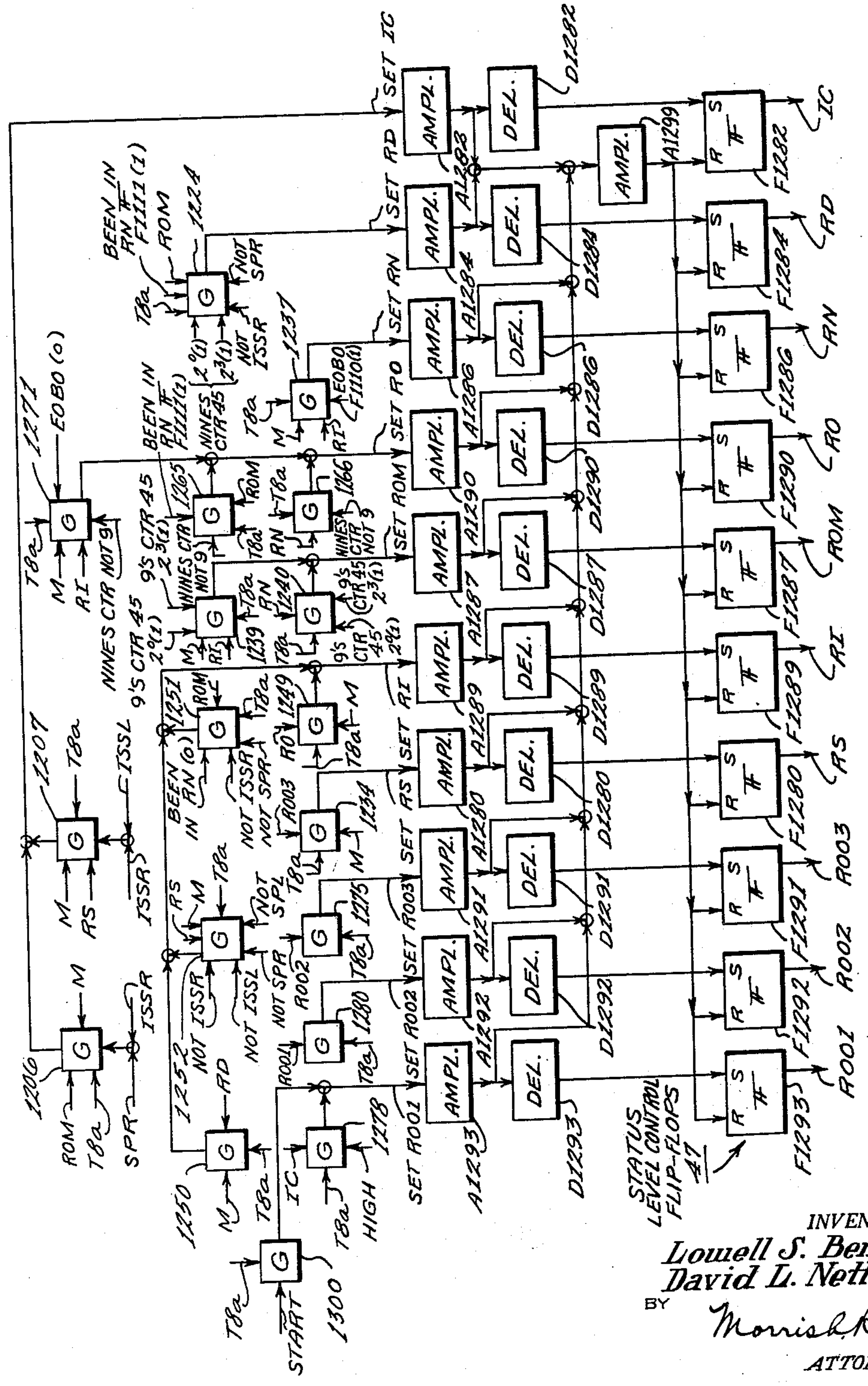

A previous result zero flip-flop F1101 is utilized, as will be more fully described below, to provide storage for a signal indicating the fact that, as the term implies, a previous result was zero. Thus the "one" output from this flip-flop is merely indicated by an outgoing arrow. The termination of the various connections from this "one" output is, of course, indicated in the other portions of this circuit description, particularly with respect to FIGURE 6. The set input of the previous result zero flip-flop F1101 is provided by the output of a four-input gate 1106. Three of the inputs to the gate 1106 provided respectively, by the operation level M, the status level RS, and the eighth timing pulse T8. The fourth and final input to the gate 1106 is received from the output of an "or" circuit having inputs from either the ISSR or ISSL recognition circuits. The reset input to the previous result zero flip-flop F1101 is provided by the output of a three-input gate 1137. One of the inputs to the gate 1137 is provided by a continuous high level input. The remaining two inputs to the gate 1137 are received from the second timing pulse T2 and from the status level R003. It will be noted that many of the recognition circuits and storage flip-flops in FIGURE 5 have merely an indicated output. Certain of these outputs find their usage in the recognition gates for deriving the successive sequences of status levels as is shown by the circuitry of FIGURE 6. FIGURE 6 will be next considered.

2.7 *Description of the circuits of FIGURE 6*

With reference to FIGURE 6 the ten status levels concerned with the present operation of multiplication are shown by ten leads designated as R001, R002, R003, RS, RI, ROM, RO, RN, RD, and IC. These ten leads are, respectively, the "one" output terminals of a set of flip-flops F1293, F1292, F1291, F1280, F1289, F1287, F1290, F1286, F1284 and F1282, inclusive, which are designated as the status level control flip-flops 47. These status level output leads are not carried continuously to the other figures but are indicated throughout by their appropriate reference letters.

The set terminals S of the status level control flip-flops 47 are connected to receive, respectively, as itemized above, the output of the delay circuits D1293, D1292, D1291, D1280, D1289, D1287, D1290, D1286, D1284, and D1282, respectively. The inputs of these delay circuits are connected to receive the outputs, respectively, of amplifiers A1293, A1292, A1291, A1280, A1289, A1287, A1290, A1286, A1284, and A1282. The inputs to these amplifiers last mentioned are designated, respectively, as "set R001" lead, "set R002" lead, "set R003" lead, the "set RS" lead, the "set RI" lead, the "set ROM" lead, the "set RO" lead, "set RN" lead, the "set RD" lead, and the "set IC" lead. The output of the amplifiers A1293, A1292, A1291, A1280, A1289, A1287, A1290, A1286, A1284, and A1282 are applied through a series of "or" circuits to an amplifier A1299, the output of which is applied to reset terminals R of each of the various status level control flip-flops 47. Each of the "set" leads is activated by recognition circuits. Thus a three-input "and" gate 1278 is provided having its output applied to the set R001 lead. One input to the gate 1278 is from the status level IC. The status level IC is assumed high upon the completion of any given instruction. The same occurs at the end of the operation M as will be subsequently discribed. The second input to the gate 1278 may, for the purposes of this invention, be considered always high. The third input to the gate 1278 is from the eighth delayed timing pulse T8*a*.

A second two-input gate 1300 is connected through an "or" circuit along with the output of the gate 1278 to the set R001 lead. The gate 1300 receives one input from the eighth delayed timing pulse T8*a*. The second input to the gate 1300 is indicated by a designation start which, may for example, be the start push button whereby the computer is first started into operation, and the status level R001 is first to be selected.

A two-input gate 1280 has one input from a status level R001, and a second input from the eighth delayed timing pulse T8*a*. The output of the gate 1280 is applied to the set R002 lead. Similarly, a two-input gate 1275 receives one input from the status level R002 and a second input from the eighth delayed timing pulse T8*a*, The output of the gate 1275 is applied to the set R003 lead. A three-input gate 1234 is employed to provide an output to the set RS lead. The first of the three inputs to the gate 1234 is provided by the operation level M. The second and third inputs, respectively, to the gate 1234 are received from the status level R003 and the eighth delayed timing pulse T8*a*.

Four gates 1249, 1250, 1251 and 1252 respectively, are coupled through "or" circuits to the set RI lead. The first of these gates namely, gate 1249 is a three-input gate. The first of the three inputs is provided by the operation level M. Remaining two inputs are provided by the status level RO, and the eighth delayed timing pulse T8*a*. The second gate 1250 is also a three-input gate receiving inputs from the operation level M, the status level RD, and the eighth delayed timing pulse T8*a*. Another of these group of four gates 1251 is a five-input gate. The first two of these inputs are received from the status level ROM and the eighth delayed timing pulse T8*a*, respectively. Third input to the gate 1251 is provided by the not SPR output from the recognition gate R1052 (FIG. 4). The fourth input to the gate 1251 is provided by the not ISSR output from the recognition circuit R1054 (FIG. 4). The final input to the gate 1251 is received from the "zero" output of the "been-in RN" flip-flop F1111 (FIG. 5). The last of these four gates, namely gate 1252, is a seven-input gate receiving inputs from the operation level M, the status level RS, and the eighth delayed timing pulse T8*a*. An additional two of the seven inputs are received from the not SPR and the not SPL recognition circuits R1052 and R923 (FIG. 4), respectively. The final two inputs to the seven-input gate 1252 received from the not ISSR and not ISSL recognition gates R1054 and R922 (FIG. 4), respectively.

The set ROM lead is connected to receive the outputs of an "or" circuit which in turn receives inputs from either of two gates 1239 or 1240, respectively. The first of these gates 1239 is a five-input gate receiving three of the inputs from the operation level M, the staus level RI, and the eighth delayed timing pulse T8*a*. The remaining two inputs to the gate 1239 are provided by the "one" output of the $2^0$ stage of the nines counter 45 (FIG. 5), and the "one" output of the $2^3$ stage of the nines counter 45 (FIG. 5). The remaining gate 1240 connected to the set ROM lead is a four-input gate receiving inputs from the status level RN, and the eighth delayed timing pulse T8*a*. The final two inputs to the gate 1240 are provided by the "one" outputs of the $2^0$ and $2^3$ stages of the nines counter 45 (FIG. 5) as set forth above.

The output of three gates 1265, 1266, and 1271 are connected through "or" circuits to the set RO lead. The first of these three gates, namely gate 1265, is a four-input gate receiving inputs from the status level ROM, and the eighth delayed timing pulse T8*a*. The remaining two inputs to the gate 1265 are received from the nines counter not nine output (FIG. 5) and from the "one" output of the "been-in RN" flip-flop F1111 (FIG. 5). The second gate 1266 is a three-input gate. First input to the gate 1266 is provided by the status level RN. The second input to the gate 1266 is from the eighth delayed timing pulse T8*a*. A final input to the gate 1266 is provided by the nines counter not nine output (FIG. 5). The final one of the three gates, namely gate 1271 is a five-input gate. Three of the inputs to the gate 1271 are provided by the operation level M, the status level RI, and the eighth delayed timing pulse T8*a*. The fourth input to the gate 1271 is provided by the nines counter not nine output (FIG. 5). The final input is provided by the "zero" output of the EOBO flip-flop F1110 (FIG. 5).

The output of a single gate 1237 is connected to the set RN lead. Four priming inputs to the gate 1237 are provided, the first of which being from the operation level M. The second and third input to the gate 1237 are from the status level RI, and the eighth delayed timing pulse T8*a*. The final input to the gate 1237 is provided by the "one" output of the EOBO flip-flop F1110 (FIG. 5).

The output of a seven-input gate 1224 is connected to the set RD lead. Two of the inputs to gate 1224 are from the status level ROM and the eighth delayed timing pulse T8*a*, respectively. An additional two inputs to the gate 1224 are provided by the "one" outputs of the respective $2^0$ and $2^3$ stages of the nines counter 45 (FIG. 5). The one output of the "been-in RN" flip-flop F1111 (FIG. 5) provides an additional input to the gate 1224. The final two inputs to this gate are received from the not ISSR and not SPR outputs of the recognition gates R1054 and R1052 (FIG. 4), respectively.

Finally, the input to the set IC lead is received from the output of an "or" circuit receiving inputs from either of two gates 1206 or 1207. Three of the inputs to the gate 1206 are provided by the operation level M, the status level ROM, and the eighth delayed timing pulse T8*a*. Remaining input to the gate 1206 is received from the output of an "or" circuit, which in turn, receives inputs from either the SPR or ISSR leads (FIG. 4). Similarly, the gate 1207 receives inputs from the operation level M, the status level RS, and the eighth delayed timing pulse T8*a*. The fourth and final input to the gate 1207 is provided by the output of an "or" circuit receiving inputs from either the ISSR or ISSL leads of FIGURE 4. The specific operation of these circuits of FIGURE 6 will be described in detail in Section 3.1 below.

3.0 *Operation*

3.1 *Staticizing instructions*

The instructions to be completed may be stored in a surge tank section of the left and right HSM 15 and 16 as described, for example, in the patent to Bensky et al., 2,679,268. Thus it may be assumed that a preceding instruction withdrawn from the HSM 15, 16 has been performed by the machine and that the current instruction to multiply two numbers (operation M) is now to be withdrawn from the surge tank. In this event, the status level IC is presumed to be high along with another input (herein labeled high) to the status transition gate 1278 (FIG. 6). Therefore gate 1278 passes the eighth delayed timing pulse T8*a* to the set R001 lead.

In the alternative, for simplicity of description, it might be assumed that the sole function of the machine is to multiply two numbers, in which event, a gate 1300 may be utilized. In this event, a start signal provided by the operator will prime the gate 1300, which, upon the occurrence of the eighth delayed timing pulse T8*a*, sets the set R001 lead. The pulse thus passed, in either of these two cases, is amplified by the amplifier A1293 and A1299. Pulse passed by the amplifier A1299 resets all of the status level control flip-flops 47. After passing through the delay circuit D1293 the pulse sets the status level control flip-flop F1293 and the status level R001 is high.

3.1.1 *Status level R001 high*

T1

Having just provided a start signal, and the R001 status level having been selected, the gate 502 (FIG. 2) passes the first timing pulse T1 to reset the A and B counters 10 and 11, respectively (FIG. 2). Simultaneously therewith, gate 629 (FIG. 1) passes the first timing pulse to prime gates 630 and 630*a* (FIG. 1). Gates 630 and 630*a* thus primed allow the program subcounter PSC to address the left and right HSM 15 and 16 (FIG. 3), respectively, at (000), the location of the fourteen (14) most significant bits of the first instruction. It may be assumed that the program subcounter PSC (FIG. 1) has a count corresponding to the address in the memory corresponding to the instruction (to perform operation M—multiply) about to be read out. Also gate 1401 (FIG. 1) passes the first timing pulse T1 thereby resetting the 0 register 30 (FIG. 1).

T2

During the second timing pulse T2 the gate 244 (FIG. 1) increases the count of the program subcounter PSC by one. Second timing pulse T2 also passes through the gate 481 (FIG. 2) thereby resetting the A register 26. Note that the gates 630 and 630*a* (FIG. 1) were closed before the program subcounter PSC count was advanced.

T5–T6

The left and right read-out gates 730 and 862, respectively (FIG. 3), have high outputs because of the high status level R001 which activates the read-out circuits of the left and right HSM 15 and 16 (FIG. 3), respectively. The information to be read out of the left HSM 15 and the right HSM 16 (FIG. 3) thus becomes available during the fifth and sixth timing pulses T5—T6 from the location addressed during the immediately preceding first timing pulse T1. The six bits from the output of the left HSM 15 (FIG. 3) are now passed through the gates 1402 to the 0 register 30 (FIG. 1). Simultaneously the sixth timing pulse T6 opens the gate 402 (FIG. 2) whereupon the six bits from the right HSM 16 (FIG. 3) are passed to the six highest order stages of the A register 26 (FIG. 2). Since the 0 register 30 (FIG. 1) receives the six bits applied to it, which are here assumed to be coded for the operation matrix OM (FIG. 1) to select the operation level M, the operation M is selected and becomes high, all other operation levels remaining low.

T8a

The status transition gate 1280 (FIG. 6) passes the eighth delayed timing pulse T8*a* to the set R002 lead, in a manner similar to that which the R001 status level was selected to be high. The status level R002 is now selected to be high. Because of the similarity in the manner in which the different status levels are selected, i.e., passing of the eighth delayed timing pulse T8*a* to an appropriate set lead followed by resetting all the status level control flip-flops 47, and thereafter applying the delayed pulse from the appropriate set lead to the appropriate one of the status level control flip-flops 47 to set the selected flip-flop and cause the selected status level to be high, no further description of this selection is believed necessary. Further it is believed unnecessary to describe in detail the selection of the status levels. The status level R002 is now high.

3.1.2 *Status level R002 high*

During R002 the second third of the instruction is transferred from the HSM to the several registers and counters.

T1

The gates 630 and 630*a* (FIG. 1) are again opened by the first timing pulse T1 passed through the gate 629 (FIG. 1). The address circuits of the left and right HSM 15 and 16 respectively (FIG. 3) are thus addressed by the program subcounter PSC through the gates 630 and 630*a* (FIG. 1).

T2

The count of program subcounter PSC (FIG. 1) is advanced by one as before. The program subcounter PSC now holds the address of the HSM location of the last third of the instruction multiply.

T5–T6

The read out circuits of the left and right HSM 15, 16 (FIG. 3) respectively are activated by the left and right read out gates 630 and 862 respectively (FIG. 3) as previously described. At the sixth timing pulse T6 the gates 405 (FIG. 2) are opened to fill the remaining three low order bits of the A register 26 from the left HSM 15 output. At the same time, the gate 512 (FIG. 2) passes the sixth timing pulse T6 to open the gates 544 (FIG. 2) thereby passing the other three bits from the left HSM 15 (FIG. 3) into the B counter 11 (FIG. 2) and six bits from the right HSM 16 (FIG. 3) to the gates 547 (FIG. 2) and into the B counter 11. Note that in this instance, the B counter acts the same as the register.

T8a

Status transition gate 1245 (FIG. 6) passes the eighth delayed timing pulse *T8a* to cause the status level R003 to be high.

3.1.3 *Status level R003 high*

During status level R003, the final third of the instruction is transferred from the HSM into the several registers.

T1

As in R001 and R002, gate 629 (FIG. 1) primes gates 630 and 630*a* thereby addressing the HSM 15, 16 at the addresses previously set into the program subcounter PSC (FIG. 1).

T2

The count of the program subcounter PSC (FIG. 1) is advanced by one as before. C register 28 (FIG. 2) is reset by the gate 442 (FIG. 2) which passes the second timing pulse T2 to perform the resetting operation.

T4

The contents of the A register (FIG. 2) are transferred through gate 541 to the A counter 10 (FIG. 2). Gate 510 passes the fourth timing pulse T4 to open the gate 514.

T5–T6

The left and right read-out gates 730 and 862 respectively (FIG. 3) are opened and their outputs have a high level thereby activating the read-out circuits of the left and right HSM 15, 16 (FIG. 3) as occurred in the preceding status level R001 and R002. The sixth bits from the left HSM S15 (FIG. 3) pass through the gate 436 (FIG. 2) and are entered into the six higher order stages of the C register 28 (FIG. 2). At the same time the three lowest orders of these six bits also pass through the gate 324 (FIG. 2) and are entered in the three higher order stages of the C counter 12. Simultaneously the six bits from the right HSM 16 (FIG. 3) pass through the gate 430 (FIG. 2) which were primed during the sixth timing pulse T6 into the six lowest order stages of the C register 28 (FIG. 2). These same six bits from the right HSM 16 (FIG. 3) also simultaneously pass through the gates 318 to the six lowest order stages of the C counter 12 (FIG. 2). Accordingly the 12 bits, six from the left HSM 15 and six from the right HSM 16, are now entered in the C register 28. The nine lowest ordered ones of these bits are also entered in the C counter 12.

By way of information the three highest order bits $2^9$, $2^{10}$, and $2^{11}$ are entered in the C register from the left HSM 15 (FIG. 3) for certain further usages which will be described in more detail below. For the present, suffice it to say that the $2^9$ bit is utilized to indicate which high speed memory, the left or the right, is to be addressed for the location of the result. The $2^{11}$ (1) bit is utilized to prevent reading into the HSM in certain operations such as multiplication.

T7

The gate 239 (FIG. 1) passes the seventh timing pulse T7 to reset the program subcounter PSC.

T8

Upon the advent of the eighth delayed timing pulse *T8a*, the status transition gate 1234 (FIG. 6) selects the status level RS.

3.1.4 *Summary of status levels*

Staticizing the instruction refers to the sequence of events in which the instruction is taken from the high speed memory and placed in a group of flip-flop registers and counters. From the registers and counters it is then possible to set up conditions for an operation to address the high speed memory at the location of the data required to perform the operation and to address the high speed memory at the location where the answer, if any, is to be stored. The instruction has been stored in the high speed memory either during a previous surge of instructions from the program drum in the surge tanks in both halves of the high speed memory or by a manual setting by an operator. Therefore, three status levels are required to extract the instruction from the high speed memory. The status levels that will be activated during the staticizing of an instruction are termed R001, R002, and R003. One-third of the instruction is staticized during each of these levels.

In R001, a portion of the first third of the instruction is stored in the 0 register 30 (FIG. 1), from which the operation to be performed is selected. In addition, a portion of the first third of the instruction is stored in the A register (FIG. 2).

During R002, the second third of the instruction is staticized. Thus the storage in the A register 26 (FIG. 2) is completed and storage in the B counter 11 (FIG. 2) is performed.

During R003, the last third of the instruction is staticized in the C register 28 (FIG. 2). Simultaneously the least significant nine bits of this group which were transferred to the C register are transferred to the C counter 12 (FIG. 2). Also during R003, the contents of the A register are transferred to the A counter. Particular usage of the instruction as staticized will be illustrated in the succeeding section 3.2, relating to performing of specific operations of multiplication.

3.2 *Performing operation M (multiplication)*

To perform multiplication the multiply instruction is staticized in the usual way and arranged as follows:

| | |
|---|---|
| 0 section | Code number for multiplication. |
| A section | Address of the multiplicand. |
| B section | Address of the multiplier. |
| C section | Address of the product. |

Upon the occurrence of the eighth delayed timing pulse *T8a*, the status level RS is selected via by the status transition gate 1234 (FIG. 6) which is now primed by the high operation level M. As described above, the output of gate 1234 actuates amplifier A1280 which in turn provides an output through delay line D1280 of the status level control flip-flop F1280 whereupon the status level RS comes high.

Note that under this state of conditions the space-left flip-flop F911 (FIG. 4) is in the set condition. The set condition in the space-left flip-flop F911 results from the passage of the first timing pulse T1 through the gate 945, during the high status level R003, to the set input of the space-left flip-flop. Also the space-right flip-flop F1008 (FIG. 4) is in the set condition having received a set impulse from the same gate 945.

Figure 9:
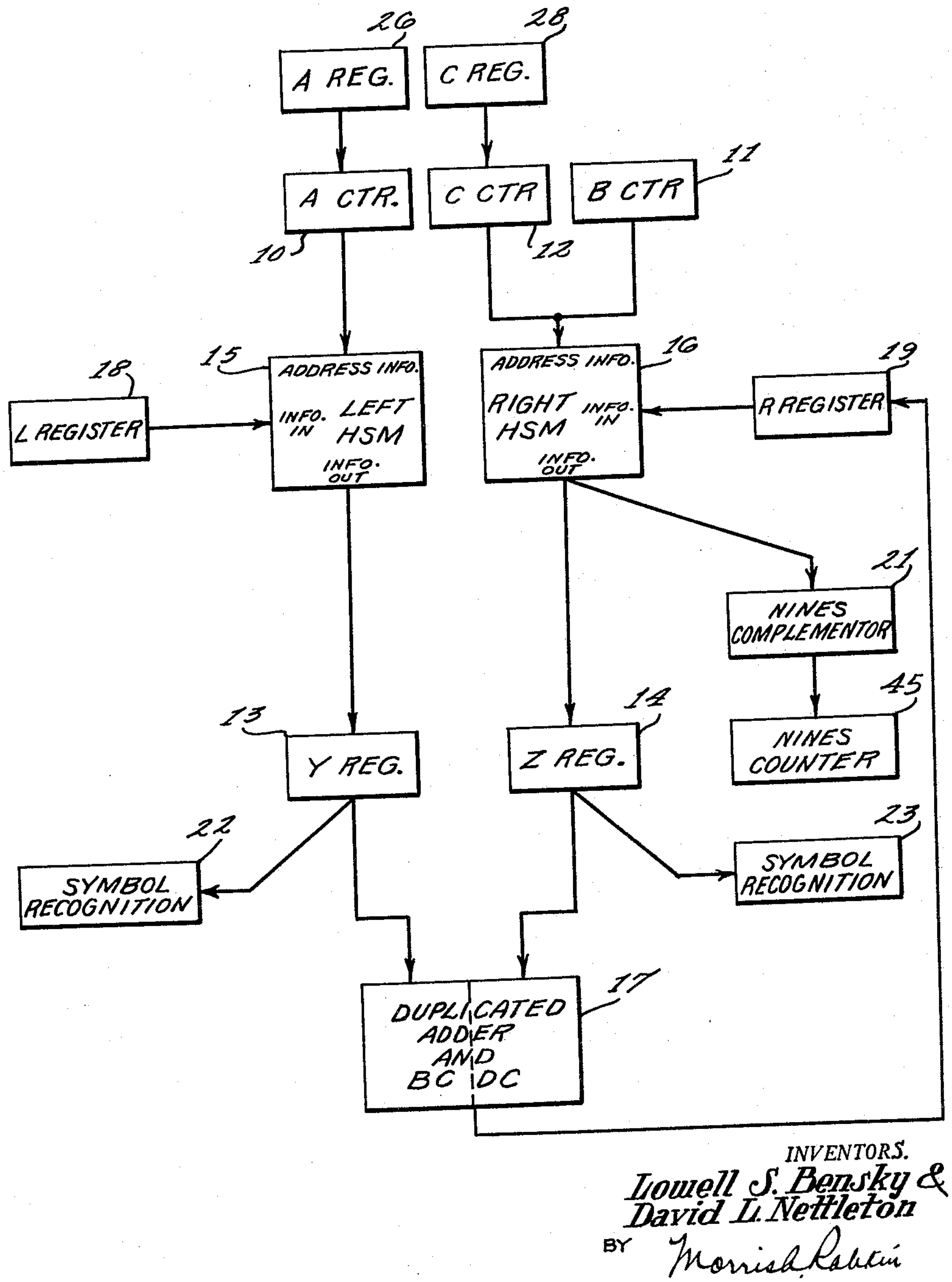
FIGURE 9 is a block diagram illustrating the major components of FIGURES 1 to 5 inclusive.

Before proceeding further with the detailed description, of the operation M, it is perhaps best to consider the summarizing drawing of FIGURE 9 which is a generalized block diagram of the major components of the system for practicing the invention and will perhaps facilitate the understanding thereof.

Multiplication is performed by repeated additions and shifts, no negative operands being permitted. The first phase of the operation is a search for the least significant digits of (1) the multiplicand, located in the left HSM 15 and addressed by the A counter 10, and (2) of the multiplier located in the right HSM 16 and addressed by the B counter 11. This searching entails reading out of the addressed memory locations into the Y and Z registers 13 and 14 from which recognition by the symbol recognition circuits 22, 23 takes places. The least significant multiplier digit is then read through the nines complementer 21 to the nines counter 45. Thereby, the nines counter is preset with the nines complement of the multiplier digit.

When both of these least significant digits have been located, the first series of additions in the duplicated binary adder and binary coded decimal converter 17 is begun. The multiplicand is added to the partial product (normally zero at the start), which is located in the right HSM 16 and addressed by the C counter 12, by means of successive cycles of read out and read in until the item separation symbols are recognized. The resulting sum is read back into the partial product location in the right high speed memory as addressed by the C counter 12. When the end of the multiplicand is recognized, the count of the nines counter 45 is increased by one and a check is made for overflow (when the nines counter reaches nine). If no overflow has occurred, a further addition is necessary. However, the A and C counters 10 and 12, have been increased during the previous addition and it is now necessary to reset them to their original addresses. This address information is retained by the A and C registers 26 and 28 which restore the A and C counters 10 and 12, respectively, to the least significant digit addresses of the partial product and multiplicand. When the nines counter overflows a new multiplier digit is read from the right HSM 16 through the nines complementer 21 into the nines counter 45. An effective shift of the partial product is now made by increasing by one the address of the least significant digit of the partial product and setting the C register 28 and C counter 12 with this information. A new series of additions is now performed until the nines counter again overflows.

Upon this overflow a shift is again made and another series of additions begun. This process of adding until the nines counter 45 overflows, shifting, and adding again, proceeds until an item separator symbol is recognized by the symbol recognition circuits 22 during the multiplier read out. Upon such recognition, the operation is terminated. The product will now be found in the HSM with the least significant digit at the C address of the original multiplication instruction. Note here, the use of the registers to back up the counters, so that a search for the least significant digits of the operands need be made only once. Note also the unique shifting arrangement wherein the address only of the partial product is shifted and not the entire partial product itself. Both of these features provide for a novel high speed operation upon variable non-standard maximum length items. Having thus described the multiply operation in general, the operation will now be described in detail following the sequences of status levels and timing pulses.

3.2.1 *Status level RS high*

T1

During staticizing as described above, the address of the multiplicand is staticized in the A register 26 and subsequently transferred to the A counter 10 (FIG. 2). Similarly the address of the multiplier is read (staticized) directly into the B counter 11 (FIG. 2). Finally the address of the product is staticized in the C register 28 (FIG. 2) and into the C counter 12. Under these conditions, with the operation level M and the status level RS high, the A counter 10 addresses the multiplicand location in the left HSM 15 (FIG. 3) through the gates 640 by a simple transfer of the contents of the A counter to the addressing circuits of the left HSM 15. Similarly the B counter 11 (FIG. 2) addresses the right HSM 16 (FIG. 3) through the gates 670. The gates 670 (FIG. 2) are primed by the output of the gate 693. Both gates 670 and gates 693 (FIG. 3) pass the first timing pulse T1 to provide this priming input. Simultaneously the A register 26 (FIG. 2) is cleared by this first timing pulse T1 which is passed through the gate 404, the remaining inputs to the gate 404 being primed by the RS status level and the "one" output of the space-left flip-flop F911 (FIG. 4), which was described before as being high during the status level RS.

T2

During the second timing pulse T2 the gates 414 (FIG. 2), primed by the space-left flip-flop F911 (FIG. 4) "one" output, pass the contents of the A counter 10 (FIG. 2) into the A register 26 (FIG. 2). Simultaneously the gate 508 primed by the "one" output of the space-right flip-flop F1008 (FIG. 4) passes the second timing pulse to advance the count of the B counter 11 (FIG. 2) by one.

T3

At the third timing pulse T3 the count of the A counter 10 (FIG. 2) is advanced by one by a pulse from the gate 505. By this advance of the A and B counters 10 and 11, respectively, the successive least significant digits are read out during each RS cycle from the two memory banks until a non-space character is encountered in both locations.

T4

The nines counter 45 (FIG. 5) has four flip-flop stages and is so termed because it is used to count up to nine starting from the complement of each multiplier digit. The nines counter 45 in this case is reset by the fourth timing pulse T4, passed through the gate G1 (FIG. 5) which is primed by the output of the "one" terminal of the space-right flip-flop F1008 (FIG. 4). This priming occurs preparatory to the entry of the complement of the multiplier digit during the succeeding sixth and seventh timing pulses T6—T7. In other words, if a space is not recorded in the Z register 14, the gate 902, being primed by the "one" output of the space-left flip-flop F911 (FIG. 4), passes the fourth timing pulse to reset the Y register 13 (FIG. 4). The Z register 14 is similarly reset by the fourth timing pulse T4 which in turn is passed through the gate 1042 and thence through the delay circuit D56. The gate 1042 receives its priming input from the "one" output of the space-right flip-flop F1008 (FIG. 4). Note that with the status level RS high and the operation level M high, the left and right read-out gates 730 and 862 (FIG. 3), respectively, apply a high level to activate the read-out circuits of the left and right HSM 15 and 16 (FIG. 3), respectively. Accordingly, the left and right HSM 15 and 16 are conditioned for reading out information.

T6

With the occurrence of the sixth timing pulse T6 the contents of the left HSM 15 (FIG. 3) at the location addressed during the first timing pulse T1 from the A counter 10 (FIG. 2) are now passed through the gates 911 (FIG. 4) into the Y register 13. Gates 911 are primed by the output of gate 918 which is primed by the RS status level and the "one" output of the space-left flip-flop F911 (FIG. 4). Similarly the contents of the right HSM 16 (FIG. 3), as addressed by the B counter 11 (FIG. 2), pass into the Z register 14 (FIG. 4) through the gates 1032 (FIG. 4). Gates 1032 are opened, that is primed, by the sixth timing pulse T6 from the gate 1031. Gate 1031 receives inputs from the RS status level, the sixth timing pulse T6, and the "one" output of the space-right flip-flop F1008. The remaining input to the gate 1031 may be described, for the purposes of this invention as continuously high.

T6—T7

With the occurrence of an enlarged timing pulse T6—T7 the gate G13 applies a high level to the nines complementer 21 (FIG. 4) to open the output gates of the nines complementer 21. Note that the information from the right HSM 16 passed during the timing pulse T6 directly to the nines complementer simultaneously with the passage of information to the gates 1032 to the Z register 14 (FIG. 4). Accordingly the four least significant bits of the least significant digit of the multiplier from the right HSM 16 (FIG. 3) are passed through the gates G17 (FIG. 4) primed by the space-right flip-flop F1008 (FIG. 4) "one" output. From the gates G17 (FIG. 4) these four bits are applied to the nines counter 45 (FIG. 5). Thus the nines counter 45 holds the nines complement of the least significant digit of the multiplier (or a space as the case may be). Recall at this point that in the code employed in this machine the four least significant bits of the binary-coded character in the case of decimal numbers conform to the decimal number written in binary code, i.e., $2^0$ through $2^3$ inclusive. It should be noted at this point that the nines counter 45 was previously reset during the fourth timing pulse T4 through the gate G1.

T7

At the occurrence of the seventh timing pulse T7 the gate 944 (FIG. 4) passes the seventh timing pulse T7 to reset space-left and space-right flip-flops F911 and F1008 (FIG. 4), respectively.

T8

Figure 7:
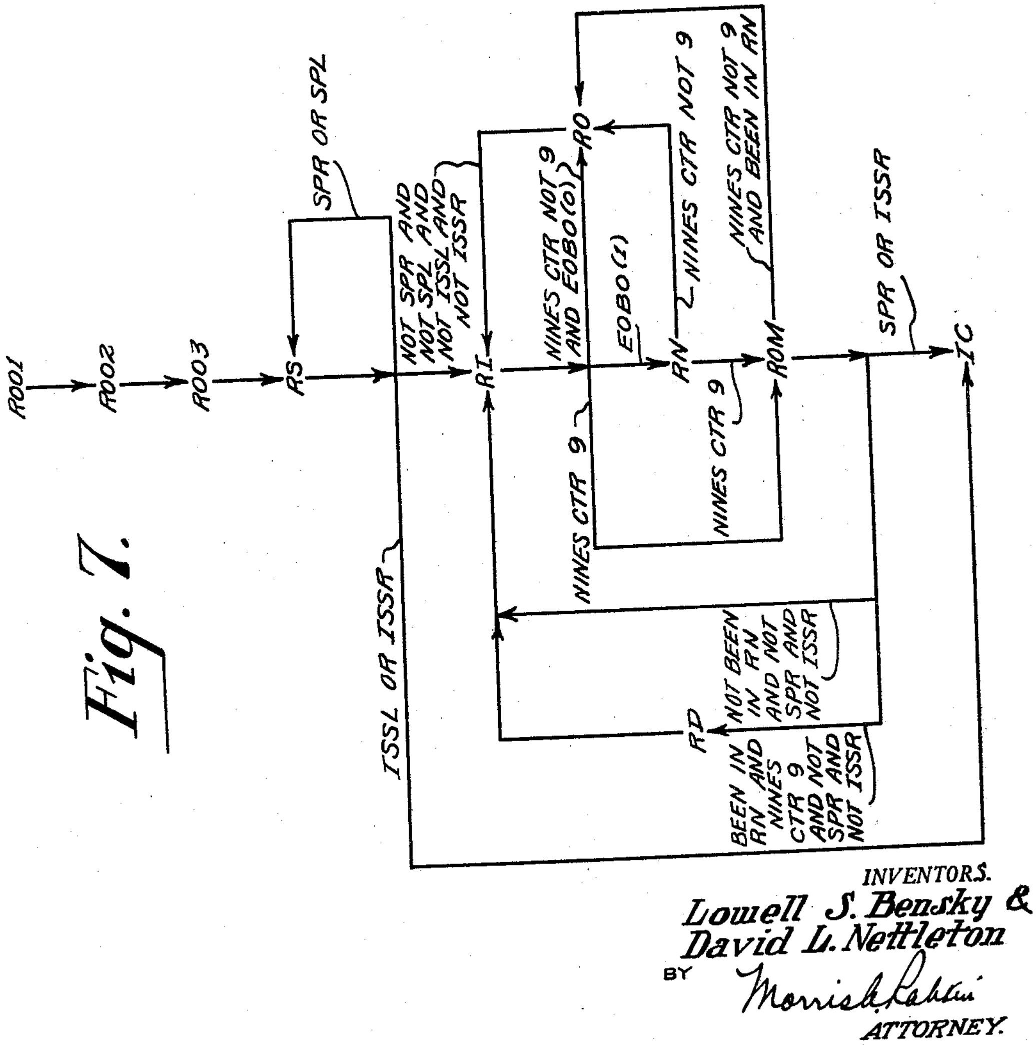
FIGURE 7 is a flow diagram of certain high status levels (a level being one of two bi-valued voltages as a particular output)

Assuming that the first multiplier character read into the Z register is not a space, the Z register 14 is reset by the eighth timing pulse T8, passed through the gate 1039 (FIG. 4) and the delay circuits D56 after passing along through suitable "or" circuits as shown. The gate 1039 is primed by the output of "or" circuit R1052 (FIG. 4) which forms a part of the right symbol recognition circuits 23 and functions to recognize the absence of a character in the Z register 14. Actually other sequences may be started at this point depending upon the particular type characters which are present in the Y and Z registers 13 and 14 respectively, as will be described below. The gate 1106 (FIG. 5) insures that if during status level RS an ISS symbol is encountered, showing that the operand is absent, the previous result zero flip-flop F1101 (FIG. 5) is set. The gate 1106 receives as one of its inputs, at this occurrence during the RS cycle, the output of an "or" gate receiving inputs from the ISSR and ISSL recognition circuits. Thus the presence of an item separator symbol for either of the operands will produce during the operation level M at the eighth delayed timing pulse T8*a* a transition to IC, instruction complete, as is indicated by the status level flow diagram (FIG. 7). Referring to FIGURE 6, the IC status level would set up in the flip-flop F1282 receiving an actuating pulse from the gate 1207.

At the eighth delayed timing pulse T8*a*, three possibilities are presented.

3.2.2 *Three possible conditions under RS high*

The three possibilities are as follows: (1) Either or both characters (multiplier and multiplicand) are a space, and another cycle of timing pulses follow, with the status level RS high; (2) An item separation symbol ISS is recognized in which case one of the operands is missing and the status level IC is immediately selected to end the multiplication operation; (3) The least significant character of each operand is recognized and in the next status level RI the actual multiplication begins. In connection with the further description of the operation when changes of status levels are involved it is suggested that reference be made to the status level flow diagram for multiplication (FIG. 7).

3.2.2.1 *One or both characters space*

The first possibility presented is that the character recorded in either the Y register 13 (FIG. 4) or the Z register 14 is a space. If the character in the Z register 14 is a space, this condition is recognized by the right symbol recognition circuit 23 as evidenced by the "or" circuits R1052 (FIG. 4); and the space-right flip-flop F1008 is set because the space right lead SPR, as heretofore described, is at a high level, and the gate 1057 (FIG. 4), having applied to it the high RS status level, passes the eighth timing pulse T8 to set the space-right flip-flop F1008. If the character in the Y register 13 (FIG. 4) is a space, the space-left flip-flop F911 (FIG. 4) is set by the eighth timing pulse T8 from the gate 938. The remaining input to the gate 938 may, for the purposes of this invention, be considered to be always high.

If both characters in the Y and Z registers 13 and 14 (FIG. 4) are spaces, both the space-left and the space-right flip-flops F911 and F1008 are set. In either situation, with the space-left or the space-right flip flop F911 and F1008 set, another RS cycle is repeated. The additional RS cycle occurs, due to the fact that there are no recognition gates comprising the status transition circuits which are actuated by this particular combination of inputs to change status levels. Therefore, the flip-flop F1280 (FIG. 6) remains high to maintain the RS status level in the high condition.

In the second RS cycle, another character is read out of the left HSM 15, or the right HSM 16. However, at this point, depending upon whether the space right flip-flop F1008 or the space-left flip-flop F911 (FIG. 4) is set or reset the gates 911 and 1032 (FIG. 4), respectively, pass or block the outputs from the left and right HSM respectively. Thus if a not-space character other than an item separation symbol ISS has been read-out from either the left or right HSM 15 or 16 (FIG. 3) the space-left flip-flop F911 (FIG. 4) or the space-right flip-flop F1008 (FIG. 4) of that particular side is in the reset condition. Accordingly, the character is held in the Y or Z registers 13 or 14 respectively as the case may be. The characters are held by the particular Y or Z register due to the fact that further inputs to the particular Y or Z registers are blocked by the gates 911 or 1032 (FIG. 4). These gates are controlled by the respective space-right or space-left flip-flop F1008 or F911 (FIG. 4) either of which may be in a reset condition thereby failing to activate these input gates.

If a not-space character other than the item separation symbol ISS has finally been read, into both the Y and Z registers 13 and 14, the status transition gate 1252 (FIG. 6) passes the eighth delayed timing pulse T8*a* to the "set RI." The status transition gate 1252 passes the eighth delayed timing pulse T8*a* due to the fact that the NOT ISSR, NOT ISSL, NOT SPR, and NOT SPL inputs all have a high level in the RS status level of the operation multiply M. Accordingly the status level RI becomes high.

3.2.2.2 *ISS before other characters*

The second of the three possibilities at the end of an RS cycle is that the character in either of the Y or Z registers 13 or 14 (FIG. 4) is an item separation symbol ISS. Upon this occurrence, the left symbol recognition circuits 22 (FIG. 4) or the right symbol recognition circuits 23 (FIG. 4) cause the output NOT ISSL from "or" circuits R922 (FIG. 4), or the output lead NOT ISSR from "or" circuits R1054 (FIG. 4), to be low. If the item separation symbol is in the Y register 13 (FIG. 4) then the ISSL lead from the ISSL inverter I11 (FIG. 4) is at a high level. If the item separation symbol is stored in the Z register 14 (FIG. 4) then the ISSR lead from the inverter I12 (FIG. 4) is at a high level. In either event, the status transition gate 1207 (FIG. 6) is primed by either one of the ISSL or ISSR leads. Status transition gate 1207 provides an output to the set IC lead which in turn actuates the status level control flip-flop F1282. Therefore the status level IC is selected to be high, and the instruction is indicated as complete. It should be noted that the presence of the item separation symbol in coded form in either the Y or Z registers 13 or 14 (FIG. 4) during the RS status level indicates that one of the operands is missing. In later stages of operation the presence of the item separation symbol in the Z register 14 (FIG. 4) indicates that the end of the multiplier has been reached and that the instruction is complete as stated above.

During the eighth timing pulse T8 the presence of the item separator symbol ISSR in the Z register 14 (FIG. 4), indicated by the high ISSR output from the inverter I12, primes the gate 1068 (FIG. 4) to pass the eighth timing pulse to reset the Z register 14 through the delay circuit D56, and also set the end of operand flip-flop F1010 (FIG. 4). Similarly, a high ISSL output from the inverter I11 (FIG. 4) primes the gate 937 to pass the eighth timing pulse T8 from gate 941 (FIG. 4) to set the ISSL flip-flop F910 (FIG. 4). The status transition gate 1207 (FIG. 6) is activated to select the instruction complete status level IC.

3.2.2.3 *Non-space characters*

The third possibility at the end of an RS cycle is that the first non-space character of a multiplier is read out of the right HSM 16 (FIG. 3) and a non-space character is read out of the left HSM 15 (FIG. 3). In this event, the sequence of status levels may now continue and the multiplication of the numbers proceed. The status transition gate 1252 (FIG. 6) provides an output to the set RI lead, thereby creating high condition of the status level control flip-flop F1289. The status level RI is thus high. This condition is selected by the absence of left and right item separation symbols and left and right space symbols. This some requirement is indicated on the flow diagram of FIGURE 7.

3.2.3 *Status level RI high*

At this point in the status level sequence with the RI status level high, there are available two possible flows. The first of these directions of possible flow as is indicated on status level flow diagram of FIGURE 7 occurs upon the event that the first multiplier digit is zero which is indicated by the nines counter registering a nine, as will be described below. The second of these alternatives at this point is that the first multiplier digit is a non-zero which is indicated by the nines counter being not-nine as will be described below. In the first of these two cases, the next status level selected is that of ROM. In the second of these cases with a non-zero multiplier digit, the status level RO is next selected. The case dealing with the first multiplier digit zero will be first considered.

3.2.3.1 *First multiplier digit zero—RI–ROM sequence*

T1

Assuming that the first multiplier digit read out and stored in the Z register 14 (FIG. 4) is a zero, the R register 19 (FIG. 3) is reset by a pulse from the gate 860 at the first timing pulse T1. The left register 18 (FIG. 3) is similarly reset during T1 by the same gate 860. The right HSM 16 (FIG. 3) is addressed by the contents of the C counter 12 (FIG. 2) at the location of the least significant digit of the product through the nine gates 660. The first timing pulse T1 passes through the gate 696 (FIG. 3) to prime, and thereby open the nine gates 660 (FIG. 2). Note that in multiplication, in this machine, the $2^9$ bit flip-flop of the C register 28 (FIG. 2) is set thereby providing the needed priming for the gate 696 to pass the first timing pulse T1. In other words the multiplier is always taken from the right HSM 16.

T2

Recall that the "been-in RN" flip-flop F1111 (FIG. 5) was previously reset by the output of gate 1139 (FIG. 5). Recall also that the count in the nines counter 45 is at nine because the first multiplier digit is assumed as zero. This zero information passes from the information output of the right HSM 16 (FIG. 3) through the nines complementer 21 (FIG. 4) which produce high outputs on each of the $2^0$ to $2^3$ bits inclusive. The output of the nines complementer pass through gate 17, primed by the output of the space-right flip-flop F1008 to set the nines counter 45. Therefore the $2^0$ and $2^3$ of the nines counter 45 (FIG. 5) are set. The timing pulse T2 is passed by the gate 837, which is primed by the $2^0$ and $2^3$ outputs of the nines counter, to set the $2^4$ and $2^6$ bit flip-flops of the R register 19 (FIG. 3). It should be pointed out that this setting, of the $2^4$ and $2^6$ bits of the R register, is not necessary to the explanation of this invention. The $2^4$ bit is entered in order to complete the binary code representation of a zero symbol. The $2^6$ bit, which is being omitted in this description of multiplication, is utilized to provide correct parity. These are in accordance with the codings employed in the said Bensky application.

T5

The contents of the R register 19 (FIG. 3), now a zero symbol, are entered into the right HSM 16 (FIG. 3) through the gate 851. As the status level RI is high, all of the inputs to the right read in gate 850 (FIG. 3) are primed. Accordingly, the gate 899 is primed both by the output of the gate 850 (FIG. 3) and the fifth timing pulse T5 along with remaining input, which for the purposes of this invention may be considered always high, to open the gate 851. Therefore the gates 851 are opened and the right HSM 16 (FIG. 3) is in condition (by the output of the gate 850) to receive the information stored in the right register 19. The digit corresponding to zero has now been read into the right HSM 16 as the first partial product digit. The $2^4$ bit has been artificially set to conform the entry to a coded numeric zero. Note that the zero multiplier read out from the right HSM 16 is artificially read into the right HSM 16 as the partial product of that multiplier digit.

T8*a*

At the eighth delayed timing pulse T8*a*, the status transition gate 1239 (FIG. 6) selects the status level ROM to be high. Note that the nines counter 45 (FIG. 5) count is nine. At this point we will return the description to the second condition which is possible under the status level RI high. The discussion of the happening of events during the status level ROM high will be discussed below in paragraph 3.2.7.

3.2.3.2. *First multiplier digit not-zero; RI–RO sequence*

The high status level RI has been selected at the end of the last RS cycle as mentioned above by the status transition gate 1252 (FIG. 6) passing the eighth delayed timing pulse T8*a* to the set RI lead, thereby setting the status level control flip-flop F1289.

T1–T3½

At the first timing pulse T1, the gates 660 pass the contents of the C counter 12 to the address circuits of the right HSM 16 (FIG. 3). The Y register 13 (FIG. 4) now contains the least significant character of the multiplicand. The contents of the Z register 14 (FIG. 4) contains the partial product digit which may be assumed to be zero at this point. Recall that the Z register 14 was reset by the gate 1039 in the preceding RS cycle. Contents of the Y register 13 and the Z register 14 are passed through the gates 27 and 21 (FIG. 5), respectively, to the duplicated adder and binary to coded decimal converter 17 (FIG. 5). Gates 27 and 21 (FIG. 5) are primed by the output of the adder input flip-flop F3 (FIG. 5). Gates 27 are additionally primed by the output of the inverter I7 whose input is connected to the "one" output of the space-left flip-flop F911 and the item separator symbol left (ISSL) flip-flop F910 (FIG. 4). These outputs lacking provide a high output from the inverter 17, thereby providing the necessary priming. Also, gate 860 passes the first timing pulse to reset the left register 18 and the right register 19 (FIG. 3). Gate G4 (FIG. 5) passes the first timing pulse to set the adder input flip-flop F3. Thus the four least significant bits of the partial product digit from the Z register 14 (FIG. 4) and the least significant character of the multiplicand from the Y register 13 (FIG. 4) are entered into the duplicated adder 17*a*.

T1½

At the timing pulse T1½ the adder flip-flop F4 is set by a pulse from the gate G10 (FIG. 5). The adder output flip-flop F41 thus allows the sum of the least significant digits of the partial product and the mutliplicand to leave the adder.

T1¾–T2¾

At T1¾ to T2¾ the contents of the binary coded decimal converter BCDC 17*b* (FIG. 5) are passed to the L register 18 (FIG. 4) and the R register 19 (FIG. 4) through the gates 717 (FIG. 5) and the gates 841 (FIG. 2). Priming the binary coded decimal converter BCDC 17*b* (FIG. 5) by the gate G9 allows the output of the adder to enter the binary coded decimal converter, be converted, and then leave the binary coded decimal converter. The output of the main binary coded decimal converter passes through the gates 717 (FIG. 5) to the left register 18. The output of the auxiliary binary coded decimal converter passes through the gates 841 (FIG. 2) into the right register 19 (FIG. 3). The gates 717 (FIG. 5) receive priming inputs in this case only in the event the nines counter 45 (FIG. 5) is not at a nine count because, in this particular cycle, the "been-in RN" flip-flop F1111 (FIG. 5) is not set. The gates 841 (FIG. 2) are similarly primed during the multiply operation level to pass the output of the auxiliary binary coded decimal converter to the right register 19 (FIG. 3).

T2

Here as before, when utilizing a code requiring a given number of bits with a parity digit, due to the fact that the adder is only a four bit adder, that is $2^0$ to $2^3$, the $2^4$ and $2^5$ bits for all decimal numbers, in certain parity systems, may be the same; $2^4=1$ and $2^5=0$. Therefore, by setting the $2^5$ bit, in the left register 18 (FIG. 3) and the right register 19 (FIG. 3) the proper binary representation for a number will be manufactured before it is read into the left and right HSM 15 and 16 respectively. Thus in this case, gate 872 (FIG. 2) will set the $2^4$ bit in the right register 19 (FIG. 3) at T2 and the gate 749 (FIG. 3) will set the $2^4$ bit in the right register 18 (FIG. 3) during the second timing pulse T2. Also the gate 301 (FIG. 2) passes the second timing pulse T2 to cause the C counter 12 to increase its count by one. Note that this second timing pulse T2 is passed only if the nines counter is not nine.

T2¾ to T3½

At the timing pulse T2¾ the gate G9 (FIG. 5) opens thereby halting the operation of the duplicated binary coded decimal converter 17*b*. Gate G11 (FIG. 5) passes the third timing pulse to reset the adder output flip-flop thereby removing the priming pulse from the duplicated adder 17*a* (FIG. 5) to cause its operation to cease. Immediately thereafter, at timing pulse T3½ gate G3 passes this timing pulse to reset the adder input flip-flop F3 (FIG. 5) thereby removing the priming signal from the gates G21 and G27, respectively, to remove the input to the duplicated adders 17*a*.

T5

The gate 899 (FIG. 3) being primed by the output of the right read-in gate 850, passes the fifth timing pulse T5 to enable the read-in circuits of the right HSM 16 so that the gates 851 (FIG. 3) pass the contents of the right register 19 thereto. Thus the least significant partial product character now stored in the right register 19 is read into the right HSM 16 at the address that was specified by the C counter 12 during the preceding first timing pulse T1.

Under an error control arrangement the contents of the left register 18 (FIG. 3) and the right register 19 (FIG. 3) may be applied to the first equal circuit 20. The comparison is made upon the occurrence of the seventh timing pulse T7 whereby equality from the two adders 17*a* (FIG. 5) may be compared for error control purposes. Since this purpose is not essential for the purposes of this invention, no further comment upon this will be made. A more complete description may be found in the above mentioned Bensky application.

Note that the $2^9$ bit flip-flop of the C register 28 (FIG. 2) is always set in multiplication, that is, has a "one" output. The reason is, as will appear more fully hereinafter, that the multiplier is always taken from the right HSM 16 (FIG. 3) to afford easy complementation. The nines complementer 21 (FIG. 4) is associated in this particular machine only with the right HSM 16 (FIG. 3) output. As the multiplicand and the partial product are always added together the number of times specified by the multiplier digit, the partial product is stored in the right HSM 16 so that the multiplicand from the left HSM 15 may be added repeatedly to the partial product sum, different each time, from the right HSM 16. Thus in programming multiplication, the programmer arranges so that the $2^9$ bit flip-flop of the C register 28 is set.

T8*a*

During the eighth delayed timing pulse T8*a*, three possible eventualities may occur. These are: (1) The nines counter 45 (FIG. 5) count is not nine. (2) The nines counter count is nine. (3) The end of both operands have been recognized. These conditions which cause the end of the RI status level will be described in detail in the succeeding section.

3.2.3.3 *Conclusion of the RI status level*

If the nines counter 45 (FIG. 5) count is not nine, the status transition gate 1271 (FIG. 6) passes the eighth delayed timing pulse T8*a* to the set RO lead. Accordingly, the status level RO is selected and the cycle with the high status level RO high takes place as is next described. This particular RI–RO flow may be observed in the flow diagram of FIGURE 7. If, on the other hand, the nines counter 45 (FIG. 5) count is nine, indicating that a zero is read out as the multiplier digit (the nines complement of zero is nine), the status transistion gate 1239 (FIG. 6) passes the eighth delayed timing pulse T8*a* to the set ROM lead. With the status level ROM high a new multiplier digit will be read out. It should be noted that the nine is detected in the nines counter by the outputs from the $2^0$ and $2^3$ bits which are the binary representation of the numeral nine.

As the third alternative, if the end of both operands (EOBO) has been recognized and the EOBO flip-flop F1110 (FIG. 5) is set. Then the status transition gate 1237 passes the eighth delayed timing pulse T8*a* to the set RN lead. Note that the EOBO flip-flop F1110 (FIG. 5) is set by the output of the gate 948. The gate 948 (FIG. 5) requires the end of operand flip-flop F1110 (FIG. 4) to be set and either the ISSL flip-flop F910 (FIG. 4) or the space left flip-flop F911 (FIG. 4) to be set in order to be primed to pass the first timing pulse and set the EOBO flip-flop during the RI status level. Note also that if the "nines counter not nine" lead is low, the multiplicand has not been added into the partial product the number of times called for by the current multiplier digit and the end of both operands cannot have been reached. At this point, assume as stated above, that the nines counter is not nine. Accordingly the status level RO high will next be selected.

3.2.4 *Status level RO high*

During the status level RO high, the second least significant digit of the multiplicand and of the partial product are to be read out of the HSM 15 and 16, respectively.

T1

From the occurrence of the first timing pulse T1, the left HSM 15 (FIG. 3) is addressed through the gates 640 (FIG. 2) with the address established in the A counter 10 (FIG. 2). In this case the gates 640 are primed as in the preceding RS status level by the operation level RO and the first timing pulse T1. It will be recalled that the A counter address of the multiplicand was advanced by one during the preceding RS status level upon the occurrence of the third timing pulse T3 by the gate 505 (FIG. 2). Similarly, the right HSM 16 (FIG. 3) is addressed by C counter 12 (FIG. 2) through the gates 660 (FIG. 2). It will be recalled that the count of the C counter, which holds the address of the partial product, was advanced by one upon the occurrence of the second timing pulse T2 during the preceding RI status level. Accordingly, the address held in the C counter for the right HSM 16 is that of the next least significant digit of the partial product stored in the right HSM 16. Thus, in effect, the C counter address is now set to that partial product address corresponding to the multiplicand digit to be added by the adder 17*a* (FIG. 5).

T2

Gate 504 (FIG. 2), being primed by the RO status level, passes the second timing pulse T2 to advance the count of the A counter 10 (FIG. 2) by one. The A counter 10 now contains the address of the next least significant digit of the multiplicand (the third least significant digit of the multiplicand).

T4

The fourth timing pulse T4 passes through gate 903 (FIG. 4) to reset the Y register 13 (FIG. 4). Also the fourth timing pulse T4 passes through the gate 1043, which is primed by the "zero" output of the end of operand right flip-flop F1010 to reset the Z register 14. In this connection, note that the end of operation right flip-flop F1010 (FIG. 4) is in the reset condition until a space or ISS is recognized by the right symbol recognition circuits 23. The read-out circuits of the left HSM 15 and the right HSM 16 are primed for read out by the left and right read-out gates 730 and 862 (FIG. 3) respectively.

T6

During the sixth timing pulse T6 the contents of the left HSM 15 (FIG. 3) containing the multiplicand, at the location addressed during the first timing pulse T1 by the A counter 10 (FIG. 2), are read out to the Y register 13 (FIG. 4) through the gates 911 (FIG. 3).

In a similar manner contents of the right HSM 16 (FIG. 3) at the location addressed by the C counter 12 during the timing pulse T1 are read out to the Z register 14 (FIG. 4) through the gates 1032 (FIG. 4). Gates 1032 are primed by the sixth timing pulse T6 which passes through the gate 1030 (FIG. 4). Gate 1030 is primed by the "zero" output of the end of operand flip-flop F1010. Note here that if the end operand right flip-flop F1010 (FIG. 4) is set, the partial product is not read out to the Z register.

Y REGISTER CONTENTS—SPACE

A special case arises if the character in the Y register is a space. In this event, the gate 938 is primed, thereby passing the eighth timing pulse T8 to set the space-left flip-flop F911 (FIG. 4). Note that the gate 938 is primed by a lead indicated high, which maintains a high level throughout for the purposes of this disclosure, and by the output of the SPL inverter I3 which is high indicating that the "or" circuits R923 of the left symbol recognition circuits 23 have detected the presence of a space symbol in the Y register. With the space-left flip-flop F911 (FIG. 4) set, note that the input gates G27 (FIG. 5) to the duplicated adder 17*a* are blocked by the low output from the inverter I7 (FIG. 4). The equivalent action is thus to add a zero from the multiplicand through the duplicated adder and binary coded decimal converter 17.

T8*a*

At the eighth delayed timing pulse T8*a*, status transition gate 1249 (FIG. 6) primed by the high status level RO, passes the eighth delayed timing pulse T8*a* to the set RI lead. Accordingly the status level RI is selected to be high.

3.2.5 *RI–RO–RI sequence*

The next RI sequence is similar to that described above for the first RI sequence of the multiply operation. The RI–RO sequence is repeated until the end of both operands (multiplicand and partial product) are recognized indicating that the entire multiplicand has been added once to the entire partial product. The end of both operands is indicated with the status level RI high by the end of both operands (EOBO) flip-flop F1110 (FIG. 5). Gate 948 (FIG. 5) recognizes the end of both operands and passes the first timing pulse of the RI cycle to set the EOBO flip-flop F1110. The status transition gate 1237 (FIG. 6) passes the eighth delayed timing pulse T8*a* to the set RN lead. In this succeeding cycle, with the status level RN high, the addresses of the partial product and multiplicand are renewed as described below.

As the last of these additions in the RI–RO sequence is completed during the RI status level, the last digit of the partial product addressed from the C counter 12, and the last digit of the mutiplicand addressed from the A counter 10 are added. Finally two end of operand characters are withdrawn. One from the left HSM 15 and one from the right HSM 16. The EOBO flip-flop F1110 (FIG. 5) is set. Note that when the EOBO flip-flop is set that the ISSL and the space-left flip-flop F910 and F911 (FIG. 4) respectively, the space-right, and end of operand right flip-flops F1008 and F1010 (FIG. 4), respectively, and the Y register 13 are reset by the eighth timing pulse T8 in the RI cycle via the gate 1130 (FIG. 5). It is to be noted that the EOBO flip-flop F1110 "one" output provides the necessary priming input to the gate 1130.

Also note that if the nines counter 45 is not nine the multiplicand should be added again to the partial product. If the nines counter were nine, the status level RO cannot become high. When the lines counter 45 count is nine, indicating that the multiplicand has been added the number of times specified by the multiplier, the next status level ordinarily to be high is ROM (to read out a new multiplier). The selection of the status level RO through which the status level RI may next occur, only occurs when the nines counter is not nine as may be seen from the priming inputs to the status transition gates 1266 and 1271 respectively (FIG. 6) which apply outputs to the set RO lead.

Status transition gate 1237 (FIG. 6) is primed by the output of the "one" terminal of the EOBO flip-flop F1110. Therefore, assuming the end of both operands is indicated, the status transition gate 1237 causes the selection of the status level RN to be high. The multiplicand and partial product addresses are to be renewed. Machine operation in multiplication with status level RN high is now described.

3.2.6 *Status level RN high* (*renew multiplicand and partial product address*)

Upon the occurrence of the first timing pulse T1, the count of the nines counter 45 (FIG. 5) is increased by one by the output of the gate G2. Gates 511 and 328 (FIG. 2) respectively, pass the first timing pulse T1 to reset the A and C counters 10 and 12 (FIG. 2) respectively.

T4

Since it is necessary to read out the least significant digit of the multiplicand and partial product again, it is necessary to set the A and C counters 10 and 12 respectively (FIG. 2) with the addresses of these digits. These addresses are stored in the A and C registers 26 and 28 (FIG. 2) respectively. Accordingly, at the fourth timing pulse T4, the address of the least significant digit of the multiplicand is transferred from the A register 26 (FIG. 2) to the A counter 10 (FIG. 2) through the gates 514 (FIG. 2) opened by a pulse from the gate 510. It will be recalled that during the previous status level RS in multiplication the A counter 10 contents were transfered to the A register 26 (on occurrence of the second timing pulse T2) before the A counter was advanced (on the occurrence of the third timing pulse T3). Thus the A register retains the address of the lowest digit of a multiplicand at all times.

The corresponding digit of the partial product to be read out has its address stored in the C register 28 FIG. 2). Gate 305 passes the fourth timing pulse T4 to prime the gates 308 (FIG. 2). Gates 308, thus primed, pass the address from the C register 28 into the C counter 12 (FIG. 2).

T8*a*

Referring to the status flow diagram of FIG. 7 at the eighth delayed timing pulse T8*a*, if the nines counter 45 (FIG. 5) is not nine the status transition gate 1266 (FIG. 6) output selects the status level RO to be high. In this event, the RO–RI sequence is now repeated until the end of both operations EOBO (multiplier and partial product) is again reached. In effect the multiplicand is one operand and the partial product is another operand for each successive addition which make up the multiply operation. The EOBO flip-flop F1110 (FIG. 5) is then set and the RN status level is again high. This sequence of events is repeated until the nines counter 45 (FIG. 5) registers a nine during the high status level RN. It should be recalled that the nines counter is advanced during each RN status level with the first timing pulse T1. When the nines counter 45 registers a nine the multiplicand has been added to the partial product a number of times equal to the digit of the multiplier which was last read out of the right HSM 16. Accordingly, a new multiplier is now required.

The status transition gate 1240 (FIG. 6) thus during the high status level RN passes the eighth delayed timing pulse to the set ROM lead. The nines counter being nine is recognized by the $2^0$ and $2^3$ inputs to the status transition gate 1240. The $2^0$ and $2^3$ binary values are nine. Thus, when each have high levels, status transition gate 1240 is activated. The ROM status level control flip-flop F1287 is now selected to be high.

3.2.7 *Status level ROM high*

During the status level ROM the next least significant digit of the multiplier is read out from the B counter and the complement of this multiplier digit is set into the nines counter 45. The B counter 11 (FIG. 2) holds the address of this second (or next) least significant digit of the multiplier. The address of this second least significant digit was set up in the B counter as will be recalled by advancing its count during the last RS (or ROM) status level by the second timing pulse T2 passed through the gates 508 (FIG. 2). Gates 693 pass the first timing pulse T1 to prime the gates 670 which in turn pass the address of the second least significant multiplier digit from the B counter 11 (FIG. 2) to the address input of the right HSM 16 (FIG. 3).

T2

During the second timing pulse T2 gate 303 (FIG. 2) triggers the C counter 12 thereby advancing the partial product address by "one" above that received from the C register 28 during the preceding RN status level. In effect, this advance of the C counter 12 count causes a shift of the partial product. The advance is the equivalent of selecting the next digit to the left of the partial sum thus far computed. Thus the partial product sum is in effect shifted right (or the subsequent entry shifted left). The C register 28 (FIG. 2) is reset by the second timing pulse T2 which passes to the gate 442 (FIG. 2).

T4

The fourth timing pulse T4 passes through the gate 1041 (FIG. 4) and through the delay circuit D56 to reset the Z register 14 (FIG. 4). Simultaneously the fourth timing pulse T4 passes through the gate G1 thereby resetting the nines counter 45 (FIG. 5). Note that the left and right HSM 15 and 16 (FIG. 3) read-out circuits are actuated by the left and right read-out gates 730 and 862 respectively.

T6

Timing pulse T6 passes through the gate 1030 (FIG. 4) to open the gates 1032 thereby passing the next least significant digit of the multiplier from the right HSM 16 (FIG. 3) into the Z register 14 (FIG. 4). A long pulse T6—T7 passes through the gate G13 (FIG. 4) thereby opening the gates of the nines complementer 21 (FIG. 4). This next least significant digit of the multiplier which was entered into the Z register 14 (FIG. 4) is thus simultaneously applied from the right HSM 16 (FIG. 3) through the nines complementer 21 (FIG. 4) and the gates G17 so that the four least significant binary digits of the complement are applied to the nines counter 45 (FIG. 5). Gates G17 are continuously primed during the ROM status level high. Thus the nines counter 45 (FIG. 5) is set to the nines complement of this next least significant digit of the multiplier.

To refresh the reader's recollection, gate 1030 (FIG. 4) received a priming input from the reset output of the end of operation right flip-flop F1010 (FIG. 4). This end of operation flip-flop F1010 was in turn reset by the output of the gate 1130 (FIG. 5) which in turn again was primed during a preceding RI cycle by the set output of the EOBO flip-flop 1110 (FIG. 5), following the read out of spaces or item separation symbols into the Y or Z registers.

T7

On occurrence of the seventh timing pulse T7 the gate 944 passes a pulse to reset the space left flip-flop F911 (FIG. 4), the space right flip-flop F1008 (FIG. 4) and the end of operand right flip-flop F1010 which as mentioned above was previously reset.

T8

The eighth timing pulse T8 is passed by the gate 1041 (FIG. 4) through the delay circuit D56 to reset the Z register 14 (FIG. 4). The nine bits corresponding to the $2^0$ to $2^8$ bits inclusive of the binary number (shifted partial product address) are passed through the gates 418 (FIG. 2), primed by the ROM status level and the eighth timing pulse T8, and entered in the nine lowest order stages of the C register 28 (FIG. 2). A tenth bit corresponding to the $2^9$ bit of the C register 28 is set by the eighth timing pulse T8 which passes through the gate 490 (FIG. 2). It will be recalled that the $2^9$ bit is utilized to select either the left or the right read out memory by activating their respective read-out gates 730 and 862 (FIG. 3) respectively.

The high status level ROM (for read out multiplier digit) has the effect also of a partial product shift. Note that a place has been selected by the C counter 12 (FIG.

2) in the right HSM (FIG. 3) for storage of the first partial product digit. The C counter 12 is advanced one when the new multiplier digit is read out and its contents stored in the C register 28 (FIG. 2). Accordingly, when the multiplicand is repetitively added into the partial product its least significant digit is added starting at the next least significant digit of the partial product address. Recall that the contents of this C register, now advanced by one, are read into the C counter 12 upon the next ensuing ROM cycle during which a succeeding multiplier digit is read out. Thus in effect the partial product is again shifted to the right, in anticipation of a succeeding multiplier digit.

**T8*a***

At the end of the status level ROM high which takes place upon the occurrence of the eighth delayed timing pulse T8*a* the alternative of four cases may be distinguished. These four cases are readily apparent from the status flow diagram of FIG. 7.

The first of these cases occurs when the "been-in RN" flip-flop F1111 (FIG. 5) is set and the nines counter 45 (FIG. 5) does not have a count of nine. In this case, the status transition gate 1265 (FIG. 6) passes the eighth delayed timing pulse T8*a* to cause the status level RO to be high. Note that the "been-in RN" flip-flop F1111 (FIG. 5) is set, only if one or more additions have been already completed. This fact of previous completed additions is indicated by the EOBO flip-flop F1110 having a set condition. The next multiplier digit has therefore been read out as is apparent from the status flow diagram. If this next multiplier digit is not a space or an item separation symbol the multiplicand must now be added to the partial product a number of times equal to the multiplier digit. This repeated addition is accomplished by another sequence of high status levels RO, RI and then RN until the nines counter 45 (FIG. 5) again equals nine. When the nines counter 45 again equals nine the multiplicand has been added to the partial product a number of times equal to the multiplier. Accordingly, another multiplier digit must now be read out of the HSM storage in the ROM status level as just explained. This RO–RI–RN—ROM sequence is repeated until a multiplier digit is found when the status level ROM is high which is a space or item separation symbol in which case the status transition gate changes the status level on the occurrence of the eighth delayed timing pulse T8*a* to the status level IC indicating completion of the instruction.

The second case may occur, if the SPR lead or the ISSR lead (FIG. 4) is high and the status level ROM is high indicating that the new multiplier digit is a space or an item separation symbol, and that the multiplication is complete. Accordingly the status transition gate 1206 (FIG. 7) passes the eighth delayed timing pulse T8*a* to cause the status level IC to be high.

Third, if the "been-in RN" flip-flop F1111 (FIG. 5) is reset and the multiplier digit read out is not a space or an item separator symbol, the first addition for the current multiplier digit remains to be accomplished. Accordingly the status transition gate 1251 (FIG. 7) passes the eighth delayed timing pulse T8*a* to cause the status level RI to become high.

The fourth case which may arise as is observed in FIG. 7 at the end of the sequence with the high status level ROM is that the next multiplier digit is a zero. If the "been-in RN" flip-flop F1111 (FIG. 5) is set indicating that this is not the first multiplier digit and the nines counter 45 (FIG. 5) count is nine (indicating a complemented zero), then the status transition gate 1224 (FIG. 6) passes the eighth delayed timing pulse T8*a* to the set RD lead. Accordingly, the high status level RD operation is considered next.

3.2.8 *Status level RD high*

During the status level RD, the least significant digit of the partial product in this case (or the least significant digit to which the address counter, C counter 12, has shifted in addressing the partial product) is now to be read out of the right HSM 16 (FIG. 3). If a space is read out, the space must be replaced by a zero. If the character read out is not a space but a digit, the digit must be read back unchanged into the right HSM 16. Stated in another manner, during the RD status level, which only occurs in the event a zero is read out for an intermediate multiplier digit, the partial product or the multiplicand is to be multiplied by a zero and added to the partial product. In other words, the partial product is to remain unchanged, but the address of the partial product shifted, and that of multiplicand returned to that of the least significant digit.

T1

Upon the occurrence of the first timing pulse T1 the right HSM 16 (FIG. 3) is addressed by the C counter 12 (FIG. 2) through the gates 660 as in the high status level RO or RI. The read out circuits for the right HSM 16 (FIG. 3) are activated through the gate 863.

T6

The least significant character of the active portion of the partial product is read fom the right HSM 16 (FIG. 3) into the Z register 14 (FIG. 4) through the gates 1032. Gates 1032, it will be noted, are primed by the gate 1030 (FIG. 4). The priming input to the gate 1030 (FIG. 4) is applied from the zero output of the end of operand flip-flop F1010 (FIG. 4) which is high.

T8

The character now in the Z register 14 (FIG. 4) is a space. The SPR lead (FIG. 4) is high and the gate 1069 (FIG. 4) passes the eighth timing pulse T8 to reset the Z register 14. Resetting the Z register 14 effectively introduces zeroes into the Z register. This has the result of adding a zero to the partial product for the zero multiplier. If on the other hand, the character in the Z register 14 is not a space, the Z register is not reset. If the partial product character in the Z register 14 is not a zero and not a space, the status transition gate 1250 (FIG. 6) passes the eighth delayed timing pulse T8*a* to select the status level RI to be high and the character is added to the contents of the now reset Y register 13 which is therefore effectively zero, for storage again without change in the right HSM 16 (FIG. 3). Recall that if one or more zeroes have been found as the first least significant digits of the multiplier, zeroes are read into the memory address for the sum as previously explained. However, after a multiplier digit other than zero has been located by successive RI–ROM–RD sequences, the "been-in RN" flip-flop F1111 (FIG. 5) is set and the partial product sum is preserved by adding and entering the sum. If the partial product digit is a space character, the sum digit is entered as a numeric zero.

3.2.9 *Status level ROM high again*

As noted above after the completion of the RN–RO–RI–RN sequences the status transition gate 1240 (FIG. 6) passes the eighth delayed timing pulse T8*a* to cause the status level ROM to be selected as high. The action of the machine with the status level ROM (FIG. 6) high is now as described above, in paragraph 3.2.7. Before proceeding note, that if the "been-in RN" flip-flop F1111 (FIG. 5) is in its reset condition at the end of the ROM status level, at the eighth delayed timing pulse T8*a*, the status transition gate 1251 (FIG. 6) will be actuated to cause the selection of the status level RI to be high. The first addition (other than for one or more initial zeroes of the multiplier) of the multiplicand and the partial product then begins. If, however, the "been-in RN"

flip-flop F1111 (FIG. 5) is set at the end of the ROM status level, the status transition gate 1256 (FIG. 6) causes the status level RO to be high and the partial product digit is read out of the HSM 16 so that the partial product is preserved in the ensuing additions.

In this connection, note that the gate 1138 (FIG. 5) the output of which sets the "been-in RN" flip-flop F1111 (FIG. 5) and the status transition gate 1237 (FIG. 6) receive the same priming or enabling voltage except for the timing pulses. The former gate 1138 (FIG. 5) receives the eighth timing pulse T8, whereas the latter status transition gate 1237 (FIG. 6) receives the eighth delayed timing pulse T8*a*. Thus the "been-in RN" flip-flop F1111 (FIG. 5) is set, and only if, the status level RN has been selected as high (as an enabling voltage), during the course of the multiplication because "the logic" for setting this flip-flop is the same as for selecting the status level RN. The sequence of status levels is therefore modified depending on the selection or non-selection of a previous status level in the course of multiplication operation.

At this point an important feature of this invention may be pointed out. It is noted that the A counter 10, and C counter 12 which maintain the addresses of the multiplicand and the active partial products, respectively, are each backed up by registers, the A register 26 and C register 28 (FIG. 2), respectively. In each case, the registers maintain the address of the least significant digit to be operated upon. Also in each case, the counters advance the address successively whereby the machine may operate upon the successive characters comprising the multiplicand and partial products. Upon the end of each successive operation, the registers may then read the permanent least significant addresses back into the counter. By this technique, a great equipment saving is effected and more flexible operation is secured; otherwise, additional status levels might be necessary.

3.2.10 *Status level RI high with a zero multiplier digit after a non-zero multiplifier digit*

It will now be assumed that upon the occurrence of the eighth timing pulse T8 during the ROM status level a zero multiplier digit is read out. Under these circumstances the nines counter is nine, and the "been-in RN" flip-flop F1111 (FIG. 5) set. Accordingly the RD status level is selected. Upon completion of the RD status level as described above, the status level RI is again selected to be high.

In such a situation wherein a zero multiplier digit follows a non-zero multiplier digit, certain deviations during the status level RI occur. Thus in the status level RI the contents of the Z register 14 (FIG. 4) are read through the binary coded decimal converter 17 (FIG. 5) back into the right HSM 16 (FIG. 3) at the address of the then least significant digit of the partial product. The contents of the Y register 13 (FIG. 4) are zero as the Y register 13 was reset in the last status level. On the occurrence of the first timing pulse T1, the L register 18 (FIG. 3) and the R register 19 (FIG. 3) are reset by a pulse from the gate 860.

The right HSM 16 (FIG. 3) is then addressed by the C counter 12 (FIG. 2) at the location of the then least significant digit of the partial products through the gates 660 (FIG. 2). Gates 660 are primed by the gate 696 (FIG. 3) which passes the first timing pulse T1 as previously described. Up to this point, the operation is the same as for the first multiplier character being zero when the status level RI is high.

The output of the adder and binary coded decimal converter 17 (FIG. 5) (which is the partial product) is passed to the R register 19 (FIG. 3) through the gates 841 (FIG. 2) which are primed by the "been-in RN" flip-flop F1111 (FIG. 5) "one" output. Note that in the current operation, this last mentioned flip-flop is set from a previous RN cycle. The $2^4$ bit flip-flop in the R register 19 which completes the coding is set through the gate 872 (FIG. 2).

The right HSM 16 (FIG. 3) is in condition to receive information by reason of a high level from the right read-in gate 850 activating the read-in circuits. The status level RI primes the gate 850. Upon the occurrence of the eighth delayed timing pulse T8*a* the status transition gate 1239 (FIG. 6) causes the status level ROM to be selected high as previously described.

3.2.11 *Completion*

If any multiplier is a space or item separation symbol during the time that the status level ROM is high, the space or item separation symbol character is applied to the Z register 14 (FIG. 4). The right symbol recognition circuits 23 (FIG. 4) detect the presence of the space or item separation symbol in the Z register 14. Accordingly, the item separation symbol right lead ISSR or the space right lead SPR, applied through a suitable "or" circuit, cause the status transition gate 1206 (FIG. 6) to be primed. Under these conditions upon the occurrence of the eighth delayed timing pulse T8*a* the status transition gate 1206 applies to the "set IC" lead, the eighth delayed timing pulse T8*a*. Therefore, the status level IC is selected to be high and the instruction is complete because the multiply characters have now been exhausted.

In the alternative an ISS may be detected from the left symbol recognition circuits 22 (FIG. 4) or in the right symbol recognition circuits 23. Note that the ISSL lead and the ISSR lead are applied through a suitable "or" circuit to the input of the status level transition gate 1207 (FIG. 6). During the RS cycle, while the status level RS is high the occurrence of the item separation symbol in the Y or Z registers 13 or 14 (FIG. 4) respectively indicates there is no multiplier or multiplicand as the case may be to be multiplied. Therefore during this high status level RS upon the occurrence of the eighth timing pulse the output of the status level transition gate 1207 (FIG. 6) thus primed sets the status level control flip-flop F1282 (FIG. 6). The status level IC is now high and the instruction is complete. Note that, in either event, the program sub-counter PSC and the drum line match flip-flop F125 are reset ready for the next sequence.

3.3 *Flow of status levels and summary of operation*

It will be recalled from paragraph 3.2, the multiplication instruction is staticized as follows:

Multiplication (M)

| | M | A | B | C |
|---|---|---|---|---|
| | (- -) | (- - -) | (- - -) | (- - - -) |
| | Multiply | Multiplicand Address | Multiplier Address | Product Address |
| Typical instruction: | 0 1 | 2 2 7 | 2 5 4 | 1 2 3 2 |
| Drum: | *000001 | *010010*111 | 010*101100 | *001010*011010 |

NOTE.—The asterisk indicates the parity bits in the characters that are stored in the magnetic program drum.

This instruction gives the command to multiply the number at location 227 in the left bank of the HSM 16 (FIG. 3) by the number stored in location 254 of the right HSM 16 (FIG. 3) and place the product in the right HSM at location 1232. The "one" numeral in 1232 here is the code representation of the fact that the right HSM 16 is to be utilized for storage of the product. This "one" is stored by the $2^9$ bit of the C register as was previously described.

The least significant digits of the multiplier and multiplicand are first ascertained and stored. The multiplicand is then added to itself a number of times equal to the least significant digit of the multiplier. To count the number of additions, the multiplier is complemented with respect to nine and then each time the multiplicand is added to itself, a one is added to the complement which is in the nines counter 45 (FIG. 5). Thus when the count of the nines counter reaches nine, the multiplicand has been added to itself a number of times equal to the least significant digit of the multiplier, or effectively the multiplicand has been multiplied by the multiplier. The condition obtained when a nines counter reaches nine is sometimes referred to as the nines counter "overflowing."

The next most significant multiplier digit is then brought out and the multiplicand handled the same way except that a portion of the partial product, as a result of the first multiplication by the first multiplier digit, is not included in the addition. That is, all digits except the least significant digit of the first partial product are added. This is equivalent to shifting the first partial product to the right and is accomplished very simply in this multiplication operation by shifting the address of the C counter (and C register) by one for each successive multiplier digit. The least significant digit of the partial product resulting from the first multiplier digit is held as the least significant digit of the final result. The multiplicand is repeatedly added to the partial product as indicated by the various digits of the multiplier, in effect shifting the multiplicand to the left as each new multiplier is brought out.

Considering this operation in somewhat more detail, reference may be had to the status level flow diagram of FIGURE 7. As is noted in FIGURE 7 the instruction is staticized during the successive status levels R001, R002, and R003. After the R003 cycle, the status level RS is selected to be high. The machine searches for the least significant digit of both the multiplier and the multiplicand. The number of RS cycles depends on the operand having the greatest number of spaces in the least significant location of the operand. When the least significant non-space character of each operand has been found, there exists two possible conditions:

(A) If the least significant character of either operand is an item separation symbol, the machine selects the status level IC (instruction complete).

(B) If the least significant character of both operands is not ISS and not space, the machine selects the status level RI to be high.

The purpose of the initial RI–RO sequence which follows is to place the multiplicand in the partial product location; that is, the multiplicand is added to zero. Note that the RI–RO sequence is entered after the RS status level only if both the multiplier and multiplicand have non-zero decimal values.

STATUS LEVEL RI HIGH

The entire partial product or the contents of the right HSM 16 (FIG. 3) at the address C, at this point should consist of space characters. The least significant digit of the multiplicand is added to the least significant character of the partial product, the latter being a zero, due to the fact that the Z register was reset during the preceding RS cycle at the eighth timing pulse T8. The result is stored in the least significant right HSM location of the partial product. The stored digit is the least significant digit of the multiplicand. In the process of this first RI status level, if the machine recognizes that the multiplier is a zero, a special condition occurs.

Under this special condition, all that need be done is enter a zero at the location of the least significant digit of the partial product. This is accomplished by resetting the adder input registers. Then the address is shifted so that the new least significant digit of the partial product is addressed next to the previously significant digit, or the zero just entered. In effect, the partial product is shifted to the right (that is multiplied by ten). The nines counter 45 (FIG. 5) had the nines count because the complemented zero multiplier digit is entered therein. The status level ROM now becomes high and a new multiplier digit is read out. The new digit is treated as the first.

If this special case of zero multiplier digits does not occur, that is, when a non-zero multiplier digit is read out, the machine goes from the high status level RI to the high status level RO.

RO STATUS LEVEL HIGH

The next least significant digit of the multiplicand and the next least significant digit of the partial product are read out of the HSM. The machine then selects status level RI to be high as before.

RI LEVEL HIGH

The succeeding least significant digit of the multiplicand and the succeeding least significant digit of the partial product are added and the result (the second least significant digit of the multiplicand) is placed in the second least significant HSM location of the partial product. The machine then continues from RI to RO, back to RO, etc., until the end of the multiplicand is read out of the HSM. The machine then selects the status level RN to be high.

STATUS LEVEL RN HIGH

The nines counter 45 (FIG. 5), which has been set with a complement of the multiplier has one added to it. The multiplicand and partial product least significant digit are to be renewed. Accordingly, the A and C counters 10, 12 (FIG. 2) are reset to the original addresses of the least significant digits of the multiplicand and partial product, which has been retained by the A and C registers 26 and 28 (FIG. 2), respectively. If the nines counter 45 (FIG. 5) count is not nine, then the multiplicand has not been added to itself the number of times required by the multiplier. Therefore the machine selects the RO level to be high.

STATUS LEVEL RO HIGH

The least significant digits of the multiplicand and of the partial product are read out of the HSM. The status level RI is now selected to be high.

STATUS LEVEL RI HIGH

The least significant digits of the multiplicand and of the partial product are added and the sum digit placed in the least significant HSM location of the partial product. The previous partial product digit is then no longer stored at this location; or, stated another way, is discarded. The RO level is now selected and the multiplication continues in a reiterated (or repeated) RO–RI sequence until the end of both operands (multiplicand and partial product are reached) as is indicated by the EOBO flip-flop F1110 (FIG. 5). The status level RN is then selected to be high again as pointed out above in order that the multiplicand and partial product may be renewed.

STATUS LEVEL RN HIGH

The nines counter has one added to it if the nines counter 45 has not yet reached nine. The previously described RN–(RO–RI) sequence is repeated. If however, the nines counter 45 has reached nine, then the multiplicand has been added to itself the number of times specified by the least significant digit of the multiplier. The level ROM is then selected to read out the second least significant digit of the multiplier. The next least significant digit of the multiplier is read out in a high status level ROM.

STATUS LEVEL ROM HIGH

It is now necessary to provide an effective shift of the new partial products to the right, by shifting the partial product present least significant digit to the left. In ROM the next least significant multiplied digit is taken from the HSM, complemented, and the nines counter 45 set in accordance with the complement. The next least significant digits of the original partial product is considered as the new or now least significant digit of the partial product. In effect, the partial product is shifted. The least significant digit of the original partial product is no longer utilized in the additions as its value has not become fixed. Therefore the least significant digit of the final product is stored in the memory. The machine then selects the status level RO to be high.

The (RO—RI)—RN sequence previously described is now repeated until the machine again selects the high status level ROM and the third least significant multiply digit is read out of the HSM, complemented, and the complement set into the nines counter 45 (FIG. 5), etc. The general flow of status levels according to the flow diagram of FIG. 7 then continues until, instead of a multiplier digit being read out of the HSM in the high status level ROM, a space or ISS (end of operand character) is read out. The status level IC then becomes high and the instruction is complete.

3.4 *Zeroes in the multiplier*

Zeroes in the multiplier are handled in a novel manner. There are two possibilities which may be reviewed as follows:

(A) The least significant digit, or digits, of the multiplier are zero, or (B) A zero first appears after a less significant character or characters of the multiplier is a non-zero.

For example:

(A) Multiplier either .2350— or .23500—.
(B) Multiplier .2035—.

CASE A.—ZERO APPEARING AS LEAST SIGNIFICANT DIGIT

If a zero is recognized as a least significant digit of the multiplier, the machine selects the status level RI to be high and a zero is placed in the location of a least significant digit of the product. The machine then selects status level ROM to be high. The second least significant multiplier digit is read out of the HSM. If the second multiplier digit is a non-zero digit it is complemented and sets the nines counter 45 (FIG. 5) to the complement. The address of the partial product to be stored is suitably shifted. The multiplier digit is cleared from its register and the status level RI is selected to be high.

The least significant digit of the multiplicand, read out of the HSM during the previous status level RS high, is added to the second least significant digit of the partial product (after the shift). The character in the partial product location of the second significant digit is a space, since the only digit in the entire partial product address is the zero from the original least significant HSM location of the partial product. The space character is treated as a zero through the use of the contents of the cleared register as mentioned in the discussion of the high status level ROM. The sum is placed in the partial product address and the operation is continued as in the general case.

If the second multiplied digit is also a zero, the previous RI status level high operation for a zero multiplier is again followed and a zero is artificially placed in the second least significant digit location of the partial product. The machine again selects ROM, etc.

CASE B.—ZERO APPEARS IN THE MULTIPLIER AFTER A NON-ZERO DIGIT

The status level ROM is high, a zero is read out of the HSM in the status level ROM, complemented, then placed in the nines counter 45 (FIG. 5). As one or more less significant multiplier digits were non-zero, the "been-in RN" flip-flop F1111 (FIG. 5) is set. With the zero multiplier digit, the nines counter count is nine and the machine enters the high status level RD. The least significant partial product digit associated with the current multiplier is read out of the HSM and status level RI is selected.

In the next status level RI high, if the character read out of the partial product is a space, then a zero is written back into the HSM at the same location the space was taken from. If the character read out of the partial product address is a decimal digit, then the same digit is added to the artificial zero and read back into the HSM location from which it was taken. The machine then selects the status level ROM to be high. In effect the same partial product has been reentered at the same address and the effective shift is ready to be accomplished. The status level ROM is now high and the next multiplier digit is read out of the HSM, complemented, and stored in the nines counter 45. The partial product is effectively shifted (by change of the C address) and if the new multiplier digit is non-zero the machine selects the high status level RO and proceeds as previously described.

4.0 *Conclusion*

There has thus been provided a system for the multiplication of positive variable non-standard maximum length operands. The system achieves multiplication automatically at a high rate of speed by repeated additions and shifts. A novel shifting technique is employed, wherein, with each shift, only the storage location address of the partial product and not the partial product itself, is shifted. The addressing means (counters) for the multiplicand and partial product are each backed up by storage (registers) which retain the current least significant digit address information. Thereby, a search for the least significant digit of the operands need be made only once. Thereafter, the registers restore the current least significant digit addresses to the addressing counters.

What is claimed is:

1. In a multiplication system for obtaining the product of two variable length operands by repeated additions to produce successive partial products, the combination comprising storage means having addresses and adapted to store said operands and said products at storage addresses, counters connected to address said operands and said products in said storage addresses, means responsive to said counters to withdraw said operands from and enter said operands into said storage, registers respectively coupled to the inputs of each of said counters for holding said addresses, means to advance the address held in at least one of said registers by one upon the completion of certain of said partial products, and means to set at least one of said counters with the said address in said one register upon the completion of each of said partial products.

2. In a multiplication system for obtaining the partial product of two variable digit length operands by repeated additions of said operands to produce successive partial products, said digits being significant in several degrees, the combination comprising storage means having addresses for storage locations for storing the digits of said operands and said products, counters connected to address said storage means, means responsive to said counters to withdraw said operands from and enter said operands into said storage, means to determine the said storage addresses of the least significant one of said digits in each of said operands, registers respectively coupled to the inputs of said counters, means to retain said least significant digit address in said registers, and means responsive to said registers to set one of said counters with said least significant digit address upon the completion of each of said partial products, whereby said least significant digit address need be determined only once.

3. In a multiplication system for obtaining the product of two variable digit length operands by repeated additions of the digits of said operands to produce successive partial products, said digits being of varying significance, each of said digits being represented by electrical signals, the combination comprising a memory having memory addresses for storing said operand and said partial product digit signals, counters connected to address said memory, means responsive to said counters to withdraw said operand and said partial product digit signals from and enter said operand and said partial product digit signals into said memory, means to ascertain said memory addresses for the least significant one of each of said operand digit signals, registers respectively coupled to the inputs of said counters, means to retain said least significant digit signal addresses in said registers, and means responsive to said registers to set one of said counters with said least significant digit address upon the completion of each of said partial products, whereby said least significant digit signal address need be ascertained only once.

4. In a multiplication system for obtaining the product of two variable digit length operands by repeated additions of the digits of said operands to produce successive partial products, said digits being of varying significance, each of said digits being represented by electrical signals, the combination comprising a memory having memory addresses for storing said operand and said partial product digit signals, a counter connected to address said memory, means responsive to said counter to withdraw the multiplicand digit signals from and enter the multiplicand digit signals into said memory, means to ascertain said memory address for the least significant one of said multiplicand digit signals, a register coupled to the inputs of said counter, and means to retain said multiplicand least significant digit signal address in said register, said counter being responsive to said register upon the completion of each of said partial products, whereby said multiplicand least significant digit signal address need be ascertained only once.

5. In a multiplication system for obtaining the product of two variable digit length operands by repeated additions of the digits of said operands to produce successive partial products, each of said digits being represented by electrical signals, the combination comprising a memory having memory addresses for storage locations for storing said operand and said partial product digit signals at preselected addresses, a counter adapted to address said memory, means responsive to said counter to withdraw said partial product digit signals from and enter said partial product digit signals into said memory to perform said multiplication, a register coupled to the inputs of said partial product counter, and means to retain said partial product preselected address in said register, said counter being responsive to said register upon the completion of each of said partial products, whereby said partial product preselected address is readily available.

6. In a multiplication system for obtaining the product of two variable length operands by repeated additions of said operands to produce successive partial products, the combination comprising storage means having storage addresses adapted to store said operands and said partial products, counters having set inputs, means responsive to said counters to withdraw said operands and said partial products from and enter said operands and said partial products into said storage means addresses, registers for holding a count and respectively coupled to the set inputs of each of said counters, and means to advance the count of one of said registers by one upon the completion of certain of said partial products.

7. In a multiplication system for obtaining the product of two variable digit length operands by repeated additions of said operand digits to produce successive partial products, said digits being represented by electrical signals, the combination comprising a memory having addresses and adapted to store said operand and said partial product digit signals, counters having set inputs, means responsive to said counters to withdraw said operand and said partial product digit signals from and enter said operand and said partial product digit signals into said memory addresses, registers for holding an address count and respectively coupled to the set inputs of each of said counters, and means to change said address count of one of said registers upon the completion of certain of said partial products.

8. In a multiplication system for obtaining the product of two variable digit length operands by repeated additions of said operand digits to produce successive partial products, said digits being represented by electrical signals, the combination comprising a memory having addresses and adapted to store said operand and said partial product digit signals, a counter, means responsive to said counter to withdraw said partial product digit signals from and enter said partial product digit signals into said memory addresses, a register for holding an address count and having an output, said counter being responsive to the output of said register, and means to advance the address held in said register by one upon the completion of each of said partial products, whereby said partial product digit signals are effectively shifted to the right.

9. In a multiplication system for obtaining the product of a variable digit length multiplier and a variable digit length multiplicand by repeated additions of said multiplicand digits to produce successive partial product digits, said digits being represented by electrical signals, the combination comprising a memory having addresses for memory locations for storing said multiplier, said multiplicand, and said partial product digit signals, a counter, means responsive to said counter to withdraw said digit signals from and enter said digit signals into said memory locations, a register for holding said partial product digit memory addresses, said counter being responsive to the output of said register, and means to advance said address in said register by one upon the completion of each partial product of said partial product digits corresponding to each of said multiplier digits, whereby said partial product digit signals are effectively shifted to the right.

10. In a multiplication system for obtaining the product of a variable digit length multiplier and a variable digit length multiplicand by repeated additions of said multiplicand digits to produce successive partial product digits, said digits varying in significance, each of said digits being represented by electrical signals, the combination comprising a memory having addresses and corresponding memory locations for storing said multiplier, said multiplicand, and said partial product digit signals, a counter, means to ascertain and store in said counter the least significant one of said multiplicand digits, means responsive to said counter to withdraw said multiplicand digit signals from and enter said multiplicand digit signals into said memory locations, means to add said multiplicand digit signals to produce said partial product digit signals, a register coupled to the inputs of said counter, and means to retain the address of said multiplicand least significant digit signal in said register, said counter being responsive to said register upon the completion of the partial product corresponding to each of said multiplier digit signals whereby the address of said multiplicand least significant digit signal need be ascertained only once.

11. A multiplication system for obtaining the product of a multiplier and a multiplicand comprising a memory having storage locations capable of storing characters of said multiplier and said multiplicand, said characters varying in significance, means to ascertain the storage locations of the least significant ones of said multiplier and said multiplicand characters, means to retain said least significant character storage locations, means responsive to said retaining means to sequentially withdraw said multiplier and said multiplicand characters from said memory starting with said least significant character, means to multiply said withdrawn multiplicand characters by each of said multiplier characters by repeated additions to obtain partial products, means to store the resulting partial products commencing at a preselected storage location in said memory, and means upon the completion of each sequential addition for each of said multiplier characters to change said retained least significant multiplier character storage location and said partial product storage location whereby said least significant digit of said multiplicand is ascertained only once and said partial product is effectively shifted to the right by said storage location change.

12. A multiplication system for obtaining the product of a multiplier and a multiplicand comprising a memory having storage locations for storing electrical signals representing characters of different order significance of said multiplier and said multiplicand, means to ascertain those of the said signal storage locations of the least significant characters of said multiplier and said multiplicand, means to retain said least significant character signals storage locations, means responsive to said retaining means to sequentially withdraw said multiplier and said multiplicand character signals from said memory storage locations starting with said least significant character signals, means to multiply said withdrawn multiplicand character signals by each of said multiplier character signals by repeated additions to obtain partial products, means to store said resulting partial products commencing at a preselected storage location in said memory, and means upon the completion of each sequential addition for each of said multiplier character signals to change said retained least significant multiplier character storage location, and said partial product storage location whereby said least significant digit of said multiplier and said multiplicand are ascertained only once and said partial product is effectively shifted to the right by said storage location change.

13. A multiplication system for obtaining the product of a multiplier and a multiplicand comprising a memory having storage locations for storing electrical signals representing characters of different order significance of said multiplier and said multiplicand, means to successively examine each of said character signals for said character significance, means to ascertain the said signal storage locations of the least significant characters of said multiplier and said multiplicand, means to retain said least significant character signals storage locations, means responsive to said retaining means to sequentially withdraw said multiplier and said multiplicand character signals from said memory starting with said least significant character signals, means to multiply said withdrawn multiplicand character signals by each of said multiplier character signals by repeated additions to produce partial products, means to store the resulting partial products commencing at a preselected storage location in said memory, means to retain said preselected location, means upon the completion of each repeated addition sequence corresponding to each of said multiplier character signals to change said retained partial product storage location whereby said partial product is effectively shifted to the right by said storage location change, and means upon the completion of each said addition sequence to change said retained least significant multiplier character signal storage location.

14. A multiplication system for obtaining the product of a multiplier and a multiplicand comprising a memory having storage locations for storing electrical signals representing characters of different order significance of said multiplier and said multiplicand, means to successively examine each of said character signals for said significance, means to ascertain the said signal storage locations of the least significant characters of said multiplier and said multiplicand, counter means for retaining counts corresponding to said least significant character signals storage locations, means responsive to said counter means to sequentially withdraw said multiplier and said multiplicand character signals from said memory starting with said least significant character signals, means to multiply said withdrawn multiplicand character signals by each of said multiplier character signals by repeated additions to produce partial products, means to store the resulting partial product commencing at a preselected storage location in said memory, counter means for retaining a count corresponding to said preselected partial product storage location, means upon the completion of each sequential addition for each of said multiplier character signals to advance the count of said partial product storage location counter means whereby said partial product is effectively shifted to the right, and means upon the completion of each sequential addition of said multiplicand character signals to advance the count of said multiplicand counter means, whereby said least significant digit of said multiplier and said multiplicand are ascertained only once.

15. In a computing system including a memory having addresses for storage locations for storing characters of varying significance, the combination with a multiplication system for effecting multiplication of a multiplier and a multiplicand in respective first and second storage locations each having component character addresses and located by a lowest order character address to obtain the product in a third storage location, said product having component character addresses and being located by a lowest order character address, of a first, second, and third counter, respectively, adapted to control said memory addresses of said multiplicand, said product, and said multiplier characters, respectively, means to ascertain the said memory addresses respectively of the least significant ones of said multiplier and said multiplicand characters, means to retain both of said least significant character storage addresses in said third and said first counters, respectively, a first and a second register, said first and said second counters, respectively, being responsive to said first and said second registers, respectively, means to successively read out and add each of said characters from the said memory addresses of said first and said second counters, means responsive to each of said read outs to advance the count of said first and said second counters by one whereby said successive partial products are formed, and means upon the formation of each of said successive partial products to set said first and said second counters, respectively, to the count of said first and said second registers, respectively, whereby said multiplicand least significant character storage address need be ascertained only once.

16. In a computing system having a memory for storing characters of varying significance, said characters being represented by electrical signals, the combination with a multiplication system for effecting multiplication of a multiplier and a multiplicand in respective first and second memory storage locations each having component character signal addresses and located by a lowest order character signal address to obtain the product in a third memory storage location having component character signal addresses and located by a lowest order character signal address thereof, of a first, second, and third counter, respectively, adapted to control said memory addresses of said multiplicand, said product, and said multiplier character signals, respectively, means to ascertain the said memory addresses, respectively, of the least significant ones of said multiplier and said multiplicand character signals, a first and a second register for retaining certain of said memory addresses, means to retain both of said least significant character signal memory addresses in said first register and said third counter, respectively, said first and said second counters, respectively, being responsive to said first and said second registers, respectively, means to successively read out and add each of said character signals from the memory addresses of said first and said second counters, means responsive to each of said read outs to advance the said addresses of said first and said second counters by one whereby successive partial products are formed, and means upon the formation of each of said successive partial products corresponding to each said multiplier character signals to set said first and said second counters, respectively, to the said addresses of said first and said second registers, respectively, and thereafter to advance the said addresses in said second register and said third counter by one, whereby said partial product is effectively shifted to the right.

17. In a computing system having a memory for storing digits of varying significance, said digits being represented by electrical signals, the combination with a multiplication system for effecting multiplication of a multiplier and a multiplicand in respective first and second memory storage locations each having component digit signal addresses and located by a lowest order digit signal address to obtain the product in a third memory storage location having component digit signal addresses and located by a lowest order digit signal address thereof, of a first, second, and third counter, respectively, adapted to control said memory addresses of said multiplicand, said product, and said multiplier digit signals, respectively, means to ascertain the said memory addresses, respectively, of the least significant ones of said multiplier and said multiplicand digit signals, a first and a second register for retaining certain of said memory addresses, means to retain both of said least significant digit signal storage addresses in said first register and said third counter, respectively, said first and said second counters, respectively, being responsive to said first and said second registers, respectively, means to successively read out and add each of said digit signals from said memory addresses of said first and said second counters, means responsive to each of said read outs to advance the addresses of said first and said second counters by one whereby successive partial products are formed, and means upon the formation of each of said sucecssive partial products corresponding to each said multiplier digit to set said first and said second counters, respectively, to the said addresses of said first and said second registers, respectively, whereby said least significant multiplicand digit signals memory address need be ascertained only once and means thereafter to advance the said addresses in said second register and said third counter by one, whereby said partial product is effectively shifted to the right.

18. In a computing system having a memory for storing digits of varying significance, said digits being represented by electrical signals, the combination with a multiplication system for effecting multiplication of a multiplier and a multiplicand in respective first and second memory storage locations each having digit signal addresses and located by a lowest order digit signal address to obtain the product in a third memory storage location having component digit signal addresses and located by a lowest order digit signal address thereof, of a first, second, and third counter, respectively, adapted to control the storage location addresses in said memory of said multiplicand, said product, and said multiplier digit signals, respectively, means to ascertain said memory addresses, respectively, of the least significant ones of said multiplier and said multiplicand digit signals, a first and a second register for retaining certain of said memory addresses, means to retain both of said least significant digit signal memory addresses in said first register and said third counter, respectively, said first and said second counters, respectively, being responsive to said first and said second registers, respectively, means to successively read out and add each of said digit signals from the memory addresses of said first and said second counters, means responsive to each of said read outs to advance the addresses of said first and said second counters by one whereby successive partial products are formed, and means upon the formation of each of said partial products to set said first and said second counters, respectively, to the addresses of said first and said second registers, respectively, whereby said multiplicand least significant digit signal address need be ascertained only once, and means to enter each of said successive partial products into said memory at the address of said second counter, and upon the occurrence of the partial product corresponding to a multiplier digit to advance the count of said second register and said third counter by one, whereby said partial product is effectively shifted to the right, and the next succeeding multiplier digit signal is addressed.

19. In a computing system having a memory for storing digits of varying significance, said digits being represented by electrical signals, the combination with a multiplication system for effecting multiplication of a multiplier and a multiplicand in respective first and second memory storage locations each having component digit signal addresses and located by a lowest order digit signal address to obtain the product in a third memory storage location having component digit signal addresses and located by a lowest order digit signal address thereof, of a first, second, and third counter, respectively, adapted to control the storage location addresses in said memory of said multiplicand, said product, and said multiplier digit signals, respectively, means to ascertain said memory addresses, respectively, of the least significant ones of said multiplier and said multiplicand digit signals, a first and a second register for retaining certain of said memory addresses, means to retain both of said least significant digit signal memory addresses in said first register and said third counter, respectively, said first and said second counters, respectively, being responsive to said first and said second registers, respectively, means to successively read out and add each of said digit signals from the memory addresses of said first and second second counters, means responsive to each of said read outs to advance the addresses of said first and said second counters by one whereby successive partial products are formed, and means upon the formation of each of said successive partial products to set said first and said second counters, respectively, to the said addresses of said first and said second registers, respectively, means to read each of the successive sums into said memory at the address of said second counter, means to recognize the most significant ones of each of said multiplicand and said partial product digit signals and upon such recognition to advance the said address of said third counter and said second register by one, whereby said partial product is effectively shifted to the right.

20. In a computing system having a memory for storing digits of varying significance, said digits being represented by electrical signals, the combination with a multiplication system for effecting multiplication of a multiplier and a multiplicand in respective first and second storage memory locations each having component digit signal addresses and located by a lowest order digit signal address to obtain the product in a third memory storage location having component digit signal addresses and located by a lowest order digit signal address thereof, of a first, second, and third counter, respectively, adapted to control the storage location addresses in said memory of said multiplicand, said product, and said multiplier digit signals, respectively, means to ascertain said memory addresses, respectively, of the least significant ones of said multiplier and said multiplicand digit signals, a first and a second register for retaining certain of said memory addresses, means to retain both of said least significant digit signal memory addresses in said first register and said third counter, respectively, said first and said second counters, respectively, being responsive to said first and said second registers, respectively, an adder, means to successively apply to the input of said adder each of said digit signals from the memory addresses of said first and said second counters, means responsive to each of said read outs to advance the addresses of said first and said second counters by one whereby successive partial products are formed, and means upon the formation of each of said successive partial products, to set said first and said second counters, respectively, to the said addresses of said first and said second registers, respectively, means to read each of the successive sums into said memory at the address of said second counter, means to recognize the most significant one of each of said multiplicand and said partial product digit signals and upon said recognition to advance the addresses in said third counter and said second register by one whereby said partial product is effectively shifted to the right.

References Cited in the file of this patent

UNITED STATES PATENTS

| | | |
|---|---|---|
| 2,679,638 | Bensky et al. | May 25, 1954 |
| 2,686,632 | Wilkinson | Aug. 17, 1954 |
| 2,749,037 | Stibitz | June 5, 1956 |
| 2,755,994 | Williams et al. | July 24, 1956 |
| 2,786,628 | Kilburn | Mar. 26, 1957 |
| 2,787,416 | Hansen | Apr. 2, 1957 |
| 2,815,168 | Zukin | Dec. 3, 1957 |
| 2,846,142 | Strachey et al. | Aug. 5, 1958 |

OTHER REFERENCES

Greenwald et al.: SEAC, Proceedings of the I.R.E., October 1953, pages 1300 to 1312.

Cohen: The Role of General Purpose Digital Computers in Automatic Control and Information Systems, I.R.E. Convention Record, Part IV, March 1954, pages 82–86.

ERA 1103, General Purpose Computer System, brochure by ERA—Div. of Remington-Rand Inc., recd. in Patent Office Library May 18, 1954, headings: General Description, Terminology, and Instruction Repertoire, on five sheets.

Notice of Adverse Decision in Interference

In Interference No. 93,523 involving Patent No. 3,016,194, L. S. Bensky and D. L. Nettleton, DIGITAL COMPUTING SYSTEM, final judgment adverse to the patentees was rendered May 12, 1965, as to claims 2, 3, 4, 6, 7, 8, 10, 11, 12 and 14.

[*Official Gazette June 22, 1965.*]